United States Patent
Wang et al.

(10) Patent No.: US 11,271,787 B2
(45) Date of Patent: Mar. 8, 2022

(54) METHOD AND APPARATUS FOR GENERATING AND RECEIVING PILOT SIGNAL

(71) Applicant: HUAWEI TECHNOLOGIES CO., LTD., Shenzhen (CN)

(72) Inventors: Lei Wang, Shanghai (CN); Yan Chen, Shanghai (CN); Xiuqiang Xu, Shanghai (CN); Lei Zhang, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/811,139

(22) Filed: Mar. 6, 2020

(65) Prior Publication Data
US 2020/0213171 A1     Jul. 2, 2020

Related U.S. Application Data

(63) Continuation of application No. PCT/CT2018/104921, filed on Sep. 11, 2018.

(30) Foreign Application Priority Data

Sep. 11, 2017   (CN) .......................... 201710814504.0
Nov. 17, 2017   (CN) .......................... 201711149096.8

(51) Int. Cl.
*H04W 76/27*    (2018.01)
*H04L 27/26*    (2006.01)
(Continued)

(52) U.S. Cl.
CPC ........ *H04L 27/2613* (2013.01); *H04L 5/0051* (2013.01); *H04W 72/042* (2013.01);
(Continued)

(58) Field of Classification Search
CPC ............... H04W 76/27; H04W 72/042; H04W 72/0446; H04W 72/0466; H04W 80/02; H04L 27/2613; H04L 5/0051
See application file for complete search history.

(56) References Cited

U.S. PATENT DOCUMENTS 7,831,822 B2 * 11/2010 Yoon ....................... H04L 67/14
                                                                                    713/154
2002/0181431 A1* 12/2002 Lorenzen ................ H04L 1/242
                                                                                     370/342
(Continued)

FOREIGN PATENT DOCUMENTS

CN         102142918 A     8/2011
CN         102377514 A     3/2012
(Continued)

OTHER PUBLICATIONS

Sharp: "DL DMRS enhancement for CoMP",3GPP Draft; R1-120276,Jan. 31, 2012(Jan. 31, 2012), XP050562816,total 10 pages.
(Continued)

*Primary Examiner* — Wei Zhao
(74) *Attorney, Agent, or Firm* — Rimon PC

(57) ABSTRACT

This application provides a method for generating a pilot signal, including: obtaining, by a terminal device, a correlation identifier and a port number; determining, by the terminal device, a pilot sequence based on the correlation identifier; and generating, by the terminal device, the pilot signal based on the pilot sequence and the port number. The correlation identifier indicates how a pilot sequence is determined and whether the pilot sequence is correlated with a time slot.

11 Claims, 15 Drawing Sheets

(51) Int. Cl.
*H04L 5/00* (2006.01)
*H04W 72/04* (2009.01)
*H04W 80/02* (2009.01)

(52) U.S. Cl.
CPC ... *H04W 72/0446* (2013.01); *H04W 72/0466* (2013.01); *H04W 76/27* (2018.02); *H04W 80/02* (2013.01)

(56) References Cited

U.S. PATENT DOCUMENTS

| | | | | |
|---|---|---|---|---|
| 2010/0098005 | A1* | 4/2010 | Lee | H04W 72/042 |
| | | | | 370/329 |
| 2013/0294318 | A1* | 11/2013 | Amerga | H04W 4/06 |
| | | | | 370/312 |
| 2017/0111147 | A1 | 4/2017 | Cao et al. | |
| 2019/0058558 | A1 | 2/2019 | Lee | |

FOREIGN PATENT DOCUMENTS

| | | |
|---|---|---|
| CN | 102413572 A | 4/2012 |
| CN | 106992847 A | 7/2017 |
| WO | 2017078413 A1 | 5/2017 |

OTHER PUBLICATIONS

Renesas Mobile Europe LTD: "Downlink OM-RS for Release11",3GPP Draft; R1-120379,Jan. 31, 2012 (Jan. 31, 2012), XP050562881,total 6 pages.

* cited by examiner

300

| A network device sends a correlation identifier and a port number to a terminal device, where the correlation identifier and the port number are used to generate a pilot signal | — S301 |

| The network device receives the pilot signal from the terminal device | — S302 |

| A terminal device receives an RRC message, DCI, or a MAC CE, where the RRC message, the DCI, or the MAC CE includes a port number, and the RRC message, the DCI, or the MAC CE further includes at least one of a scramble identifier, an identifier of a cell to which the terminal device belongs, and an identifier of the terminal device | — S401 |

| The terminal device determines a pilot sequence based on the at least one identifier of the scramble identifier, the identifier of the cell to which the terminal device belongs, and the identifier of the terminal device | — S402 |

| The terminal device generates a pilot signal based on the pilot sequence and the port number | — S403 |

| A network device sends an RRC message, DCI, or a MAC CE, where the RRC message, the DCI, or the MAC CE includes a port number, and the RRC message, the DCI, or the MAC CE further includes at least one of a scramble identifier, an identifier of a cell to which a terminal device belongs, and an identifier of the terminal device, where the port number and the at least one identifier of the scramble identifier, the identifier of the cell to which the terminal device belongs, and the identifier of the terminal device are used to generate a pilot signal | — S501 |

| The network device receives the pilot signal | — S502 |

| A terminal device receives an RRC message, DCI, or a MAC CE, where the RRC message, the DCI, or the MAC CE includes a port number and a plurality of scramble identifiers | — S601 |

| The terminal device determines a pilot sequence based on a timeslot number and a scramble identifier corresponding to the timeslot number among the plurality of scramble identifiers | — S602 |

| The terminal device generates a pilot signal based on the pilot sequence and the port number | — S603 |

FIG. 6

METHOD AND APPARATUS FOR GENERATING AND RECEIVING PILOT SIGNAL

CROSS-REFERENCE TO RELATED APPLICATIONS

This application is a continuation of International application PCT/CN2018/104921, filed on Sep. 11, 2018, which claims priority to Chinese Patent Application No. 201710814504.0, filed on Sep. 11, 2017 and claims priority to Chinese Patent Application No. 201711149096.8, filed on Nov. 17, 2017. The disclosures of the aforementioned applications are hereby incorporated by reference in their entireties.

TECHNICAL FIELD

This application relates to the communications field, and in particular, to a method and an apparatus for generating and receiving a pilot signal in the wireless communications field.

BACKGROUND

Grant free transmission is a transmission mode in the $5^{th}$ generation (5G) system for mobile communications. During grant free transmission, a terminal device can directly send data without waiting for resource scheduling information of a network device, thereby reducing a latency of uplink transmission.

During grant free transmission, to improve reliability, the terminal device retransmits a same transport block for a plurality of times, and the network device determines, based on a pilot signal, that received data is data from which transmission, thereby performing combination decoding. In addition, the network device further determines, based on the pilot signal, a terminal device that sends the received data.

Therefore, during the grant free transmission, a demand of a communications system for pilot signals is far greater than a demand of a communications system for pilot signals during grant based transmission. Consequently, a pilot signal generated based on a method for generating a pilot signal during the grant based transmission cannot meet a requirement of the grant free transmission for correlation between pilot signals.

SUMMARY

This application provides a method and an apparatus for generating and receiving a pilot signal, to meet a requirement of grant free transmission and grant based transmission for pilot signals.

According to a first aspect, a method for generating a pilot signal is provided, including: obtaining, by a terminal device, a correlation identifier and a port number; determining, by the terminal device, a pilot sequence based on the correlation identifier; and generating, by the terminal device, the pilot signal based on the pilot sequence and the port number.

The correlation identifier is used to indicate a manner in which the terminal device determines the pilot sequence. The foregoing manner in which the pilot sequence is determined, for example, is a manner in which a pilot sequence is determined and that is correlated with a timeslot, or the foregoing manner in which the pilot sequence is determined may be a manner in which a pilot sequence is determined and that is not correlated with a timeslot. Therefore, a requirement of different application scenarios for correlation between pilot signals may be met. The method for the pilot signal provided in this application may be applied to grant based transmission (including existing grant based transmission, and further including grant based transmission in a 5G system for mobile communications), or may further be applied to grant free transmission in the 5G system for mobile communications. Therefore, the solutions provided in the embodiments of this application further have relatively good backward compatibility.

Optionally, the determining, by the terminal device, a pilot sequence based on the correlation identifier includes: when a value of the correlation identifier is equal to a preset value, determining, by the terminal device, the pilot sequence based on timeslot number and at least one parameter of an identifier of a cell to which the terminal device belongs, an identifier of the terminal device, and a scramble identifier; or when a value of the correlation identifier is not equal to a preset value, determining, by the terminal device, the pilot sequence based on the correlation identifier and at least one parameter of an identifier of a cell to which the terminal device belongs, an identifier of the terminal device, and a scramble identifier.

Due to a limited quantity of orthogonal pilot sequences, a quantity of terminal devices simultaneously in communication with a network device is limited. To increase the quantity of the terminal devices simultaneously in communication with the network device, different terminal devices may use non-orthogonal pilot sequences. To reduce interference that is between the terminal devices and that is brought by the non-orthogonal pilot sequences, correlation between the non-orthogonal pilot sequences needs to be reduced to the greatest extent. In the prior art, a timeslot number is one of parameters that generate the pilot sequence, and the generated pilot sequence jumps over the timeslot number. If this generation manner in the prior art is still used, low correlation between the non-orthogonal pilot sequences that are used by a plurality of terminal devices cannot be ensured. Therefore, when the pilot sequence is used, use of the timeslot number as a parameter that generates the pilot sequence is avoided, so that relatively low correlation between pilot sequences used by the plurality of terminal devices may be ensured.

Optionally, the determining, by the terminal device, a pilot sequence based on the correlation identifier includes: when a value of the correlation identifier is equal to a preset value, determining, by the terminal device, the pilot sequence based on a timeslot number and at least one parameter of an identifier of a cell to which the terminal device belongs, an identifier of the terminal device, and a scramble identifier; or when a value of the correlation identifier is not equal to a preset value, determining, by the terminal device, the pilot sequence based on at least one parameter of an identifier of a cell to which the terminal device belongs, an identifier of the terminal device, and a scramble identifier.

Optionally, before the determining, by the terminal device, a pilot sequence based on the correlation identifier, the method further includes: receiving, by the terminal device, a radio resource control (RRC) message, where the RRC message includes configuration information of the scramble identifier.

Compared with a method, in the prior art, for indicating, jointly by an RRC message and downlink control information (DCI), a scramble identifier used by a terminal device, this embodiment reduces signaling overheads.

Optionally, the RRC message includes a plurality of scramble identifiers, and the method further includes: receiving, by the terminal device, DCI, where the DCI includes a scramble identifier index, and the scramble identifier index is used to indicate a scramble identifier used to determine the pilot sequence among the plurality of scramble identifiers.

In this embodiment, the terminal device determines the pilot sequence and generates the pilot signal based on a scramble identifier specified by a network device, and correlation between the generated pilot sequence and a pilot sequence generated by another terminal device may be further reduced.

Optionally, when determining the pilot sequence, the terminal device further uses a cyclic shift value as a parameter that determines the pilot sequence.

A plurality of pilot sequences may be generated by performing cyclic shift processing on a pilot sequence, thereby meeting a demand of grant free transmission for pilot signals.

Optionally, before the terminal device determines the pilot sequence based on the cyclic shift value and the correlation identifier, the method further includes: receiving, by the terminal device, the RRC message, the DCI, or a media access control (MAC) control element (CE), where the RRC message, the DCI, or the MAC CE includes a cyclic shift value index.

Optionally, the obtaining, by a terminal device, a correlation identifier and a port number includes: obtaining, by the terminal device, the correlation identifier and the port number based on the received RRC message; or obtaining, by the terminal device, the correlation identifier based on the received RRC message, and obtaining, by the terminal device, the port number based on the received DCI; or obtaining, by the terminal device, the correlation identifier and the port number based on the received DCI.

According to a second aspect, a method for receiving a pilot signal is provided, including: sending, by a network device, a correlation identifier and a port number to a terminal device, where the correlation identifier and the port number are used to generate the pilot signal; and receiving, by the network device, the pilot signal from the terminal device.

The correlation identifier is used to indicate a manner in which the terminal device determines a pilot sequence. The foregoing manner in which the pilot sequence is determined, for example, is a manner in which a pilot sequence is determined and that is correlated with a timeslot, or the foregoing manner in which the pilot sequence is determined may be a manner in which a pilot sequence is determined and that is not correlated with a timeslot. Therefore, a requirement of different application scenarios for correlation between pilot signals may be met. The method for the pilot signal provided in this application may be applied to grant based transmission (including existing grant based transmission, and further including grant based transmission in a 5G system for mobile communications), or may be applied to grant free transmission in the 5G system for mobile communications. Therefore, the solutions provided in the embodiments of this application further have relatively good backward compatibility.

Optionally, preset values are preset in the network device and the terminal device, where when a value of the correlation identifier is equal to a preset value, the correlation identifier is used to instruct the terminal device to generate the pilot signal in a first pattern, or when a value of the correlation identifier is not equal to a preset value, the correlation identifier is used to instruct the terminal device to generate the pilot signal in a second pattern.

The first pattern, for example, is a manner in which the pilot signal is generated based on a timeslot number, and in the pattern, the timeslot number is one of parameters that generate the pilot signal. The second pattern, for example, is a manner in which the pilot signal is generated and that is not correlated with the timeslot number, and in the pattern, the timeslot number is not a parameter that generates the pilot signal. When the terminal device transmits data in a grant based manner, a demand of a communications system for pilot signals is relatively small, and the network device may instruct the terminal device to generate the pilot signal based on the method for generating the pilot signal in the first pattern; and when the terminal device transmits data in a grant free transmission manner, the demand of the communications system for the pilot signals is relatively large, and the network device may instruct the terminal device to generate the pilot signal based on the method for generating the pilot signal in the second pattern. Therefore, the method for generating the pilot signal by the terminal device may be determined based on a current transmission manner of the terminal device.

Optionally, the sending, by a network device, a correlation identifier and a port number to a terminal device includes: sending, by the network device, an RRC message to the terminal device, where the RRC message includes the correlation identifier and the port number; or sending, by the network device, an RRC message to the terminal device, where the RRC message includes information of the correlation identifier, and sending, by the network device, DCI to the terminal device, where the DCI includes the port number.

This embodiment provides a plurality of methods for sending the correlation identifier and the port number, thereby improving flexibility and reliability of obtaining, by the terminal device, the correlation identifier and the port number.

According to a third aspect, an apparatus for generating a pilot signal is provided, and the apparatus may implement a function performed by a terminal device in the method according to the foregoing first aspect, where the function may be implemented by hardware, or may be implemented by executing corresponding software by the hardware. The hardware or the software includes one or more units or modules corresponding to the foregoing function.

In a possible design, the apparatus includes a processor and a transceiver, where the processor is configured to support the apparatus in performing the corresponding function in the method according to the foregoing first aspect. The transceiver is configured to support the apparatus in communicating with another network element. The apparatus may further include a memory, where the memory is configured to: couple to the processor, and store a program instruction and data that are necessary for the apparatus.

According to a fourth aspect, an apparatus for receiving a pilot signal is provided, and the apparatus may implement a function performed by a network device in the method according to the foregoing second aspect, where the function may be implemented by hardware, or may be implemented by executing corresponding software by the hardware. The hardware or the software includes one or more units or modules corresponding to the foregoing function.

In a possible design, the apparatus includes a processor and a transceiver, where the processor is configured to support the apparatus in performing the corresponding function in the method according to the foregoing second aspect. The transceiver is configured to support the apparatus in communicating with another network element. The apparatus may further include a memory, where the memory is configured to: couple to the processor, and store a program instruction and data that are necessary for the apparatus.

According to a fifth aspect, a network system is provided, where the network system includes the apparatus for generating a pilot signal according to the third aspect and the apparatus for receiving the pilot signal according to the fourth aspect.

According to a sixth aspect, a computer-readable storage medium is provided, where computer program code is stored in the computer-readable storage medium, and when executed by a processing unit or a processor, the computer program code enables a terminal device to perform the method according to the first aspect.

According to a seventh aspect, a computer-readable storage medium is provided, where computer program code is stored in the computer-readable storage medium, and when executed by a processing unit or a processor, the computer program code enables a network device to perform the method according to the second aspect.

According to an eighth aspect, a communications chip storing an instruction is provided, where when run on a terminal device, the instruction enables the communications chip to perform the method according to the foregoing first aspect.

According to a ninth aspect, a communications chip storing an instruction is provided, where when run on a network device, the instruction enables the communications chip to perform the method according to the foregoing second aspect.

According to a tenth aspect, a computer program product is provided, where the computer program product includes computer program code, and when run by a communications unit or a transceiver, or a processing unit or a processor of a terminal device, the computer program code enables the terminal device to perform the method according to the foregoing first aspect.

According to an eleventh aspect, a computer program product is provided, where the computer program product includes computer program code, and when run by a communications unit or a transceiver, or a processing unit or a processor of a network device, the computer program code enables the network device to perform the method according to the foregoing second aspect.

According to a twelfth aspect, a method for generating a pilot signal is provided, including: receiving, by a terminal device, an RRC message, DCI, or a MAC CE, where the RRC message, the DCI, or the MAC CE includes a port number, and the RRC message further includes at least one of a scramble identifier, an identifier of a cell to which the terminal device belongs, and an identifier of the terminal device; determining, by the terminal device, a pilot sequence based on the at least one identifier of the scramble identifier, the identifier of the cell to which the terminal device belongs, and the identifier of the terminal device; and generating, by the terminal device, the pilot signal based on the pilot sequence and the port number.

In the foregoing method for generating the pilot signal, the pilot signal does not need to be generated based on a timeslot number, and the pilot signal no longer jumps over time. Therefore, correlation between pilot signals generated by different terminal devices is reduced. When the method is applied to a scenario in which pilot signals sent by a plurality of terminal devices are not completely orthogonal, interference between the plurality of terminal devices may be reduced.

Optionally, when determining the pilot sequence, the terminal device further uses a cyclic shift value as a parameter that determines the pilot sequence.

A plurality of pilot sequences may be generated by performing cyclic shift processing on a pilot sequence, thereby meeting a demand of grant free transmission for pilot signals.

Optionally, the RRC message includes configuration information of the cyclic shift value.

According to a thirteenth aspect, a method for receiving a pilot signal is provided, including: sending, by a network device, an RRC message, DCI, or a MAC CE, where the RRC message, the DCI, or the MAC CE includes a port number, and the RRC message further includes at least one of a scramble identifier, an identifier of a cell to which a terminal device belongs, and an identifier of the terminal device, where the port number and the at least one identifier of the scramble identifier, the identifier of the cell to which the terminal device belongs, and the identifier of the terminal device are used to generate the pilot signal; and receiving, by the network device, the pilot signal.

In the foregoing method for generating the pilot signal, the pilot signal does not need to be generated based on a timeslot number, and the pilot signal no longer jumps over time. Therefore, correlation between pilot signals generated by different terminal devices is reduced. When the method is applied to a scenario in which pilot signals sent by a plurality of terminal devices are not completely orthogonal, interference between the plurality of terminal devices may be reduced.

Optionally, the RRC message further includes configuration information of a cyclic shift value, where the cyclic shift value is used to generate the pilot signal.

A plurality of pilot sequences may be generated by performing cyclic shift processing on a pilot sequence, thereby meeting a demand of grant free transmission for pilot signals.

According to a fourteenth aspect, an apparatus for generating a pilot signal is provided, and the apparatus may implement a function performed by a terminal device in the method according to the foregoing twelfth aspect, where the function may be implemented by hardware, or may be implemented by executing corresponding software by the hardware. The hardware or the software includes one or more units or modules corresponding to the foregoing function.

In a possible design, the apparatus includes a processor and a transceiver, where the processor is configured to support the apparatus in performing the corresponding function in the method according to the foregoing twelfth aspect. The transceiver is configured to support the apparatus in communicating with another network element. The apparatus may further include a memory, where the memory is configured to: couple to the processor, and store a program instruction and data that are necessary for the apparatus.

According to a fifteenth aspect, an apparatus for receiving a pilot signal is provided, and the apparatus may implement a function performed by a network device in the method according to the foregoing thirteenth aspect, where the function may be implemented by hardware, or may be implemented by executing corresponding software by the hardware. The hardware or the software includes one or more units or modules corresponding to the foregoing function.

In a possible design, the apparatus includes a processor and a transceiver, where the processor is configured to support the apparatus in performing the corresponding function in the method according to the foregoing thirteenth aspect. The transceiver is configured to support the apparatus in communicating with another network element. The apparatus may further include a memory, where the memory is configured to: couple to the processor, and store a program instruction and data that are necessary for the apparatus.

According to a sixteenth aspect, a network system is provided, and the network system includes the apparatus for generating a pilot signal according to the fourteenth aspect and the apparatus for receiving the pilot signal according to the fifteenth aspect.

According to a seventeenth aspect, a computer-readable storage medium is provided, where computer program code is stored in the computer-readable storage medium, and when executed by a processing unit or a processor, the computer program code enables a terminal device to perform the method according to the twelfth aspect.

According to an eighteenth aspect, a computer-readable storage medium is provided, where computer program code is stored in the computer-readable storage medium, and when executed by a processing unit or a processor, the computer program code enables a network device to perform the method according to the thirteenth aspect.

According to a nineteenth aspect, a communications chip storing an instruction is provided, where when run on a terminal device, the instruction enables the communications chip to perform the method according to the foregoing twelfth aspect.

According to a twentieth aspect, a communications chip storing an instruction is provided, where when run on a network device, the instruction enables the communications chip to perform the method according to the foregoing thirteenth aspect.

According to a twenty-first aspect, a computer program product is provided, where the computer program product includes computer program code, and when run by a communications unit or a transceiver, or a processing unit or a processor of a terminal device, the computer program code enables the terminal device to perform the method according to the foregoing twelfth aspect.

According to a twenty-second aspect, a computer program product is provided, where the computer program product includes computer program code, and when run by a communications unit or a transceiver, or a processing unit or a processor of a network device, the computer program code enables the network device to perform the method according to the foregoing thirteenth aspect.

According to a twenty-third aspect, a method for generating a pilot signal is provided, including: receiving, by a terminal device, an RRC message, DCI, or a MAC CE, where the RRC message, the DCI, or the MAC CE includes a port number and a plurality of scramble identifiers; determining, by the terminal device, a pilot sequence based on a timeslot number, and a scramble identifier corresponding to the timeslot number among the plurality of scramble identifiers; and generating, by the terminal device, the pilot signal based on the pilot sequence and the port number.

In the solution provided in this embodiment, the scramble identifier and the timeslot number are associated with each other, and scramble identifiers associated with different timeslot numbers may be different, or may be the same (whether the scramble identifiers are the same is specifically specified by a standard or determined by the network device). When a pilot sequence of a specific timeslot is determined, only a scramble identifier associated with (corresponding to) a timeslot number of the timeslot can be used. An effect of the scramble identifier is to offset a negative impact caused by a timeslot number change on correlation between pilot signals. In this way, even if the timeslot number changes, the correlation between pilot signals that are generated based on the timeslot number and a correlation identifier corresponding to the timeslot number still meets a transmission requirement. When the method is applied to a scenario in which pilot signals sent by a plurality of terminal devices are not completely orthogonal, interference between the plurality of terminal devices may be reduced. Optionally, when determining the pilot sequence, the terminal device further uses a cyclic shift value as a parameter that determines the pilot sequence.

A plurality of pilot sequences may be generated by performing cyclic shift processing on a pilot sequence, thereby meeting a demand of grant free transmission for pilot signals.

Optionally, the RRC message includes configuration information of the cyclic shift value.

According to a twenty-fourth aspect, a method for receiving a pilot signal is provided, including: sending, by a network device, an RRC message, DCI, or a MAC CE, where the RRC message, the DCI, or the MAC CE includes a port number and a plurality of scramble identifiers, the plurality of scramble identifiers have a one-to-one correspondence with a plurality of timeslot numbers, and the port number, the plurality of scramble identifiers, and the plurality of timeslot numbers are used to generate the pilot signal; and receiving, by the network device, the pilot signal.

In the solution provided in this embodiment, the scramble identifier and the timeslot number are associated with each other, and scramble identifiers associated with different timeslot numbers may be different, or may be the same (whether the scramble identifiers are the same is determined by the network device). When a pilot sequence of a specific timeslot is determined, only a scramble identifier associated with (corresponding to) a timeslot number of the timeslot can be used. An effect of the scramble identifier is to offset a negative impact caused by a timeslot number change on correlation between pilot signals. In this way, even if the timeslot number changes, the correlation between pilot signals that are generated based on the timeslot number and a correlation identifier corresponding to the timeslot number still meets a transmission requirement. When the method is applied to a scenario in which pilot signals sent by a plurality of terminal devices are not completely orthogonal, interference between the plurality of terminal devices may be reduced.

Optionally, the RRC message further includes configuration information of a cyclic shift value, where the cyclic shift value is used to generate the pilot signal.

A plurality of pilot sequences may be generated by performing cyclic shift processing on a pilot sequence, thereby meeting a demand of grant free transmission for pilot signals.

According to a twenty-fifth aspect, an apparatus for generating a pilot signal is provided, where the apparatus may implement a function performed by a terminal device in the method according to the foregoing twenty-third aspect, where the function may be implemented by hardware, or may be implemented by executing corresponding software by the hardware. The hardware or the software includes one or more units or modules corresponding to the foregoing function.

In a possible design, the apparatus includes a processor and a transceiver, where the processor is configured to support the apparatus in performing the corresponding function in the method according to the foregoing twenty-third aspect. The transceiver is configured to support the apparatus in communicating with another network element. The apparatus may further include a memory, where the memory is configured to: couple to the processor, and store a program instruction and data that are necessary for the apparatus.

According to a twenty-sixth aspect, an apparatus for receiving a pilot signal is provided, where the apparatus may implement a function performed by a network device in the method according to the foregoing twenty-fourth aspect, where the function may be implemented by hardware, or may be implemented by executing corresponding software by the hardware. The hardware or the software includes one or more units or modules corresponding to the foregoing function.

In a possible design, the apparatus includes a processor and a transceiver, where the processor is configured to support the apparatus in performing the corresponding function in the method according to the foregoing twenty-fourth aspect. The transceiver is configured to support the apparatus in communicating with another network element. The apparatus may further include a memory, where the memory is configured to: couple to the processor, and store a program instruction and data that are necessary for the apparatus.

According to a twenty-seventh aspect, a network system is provided, where the network system includes the apparatus for generating a pilot signal according to the twenty-third aspect and the apparatus for receiving the pilot signal according to the twenty-fourth aspect.

According to a twenty-eighth aspect, a computer-readable storage medium is provided, where computer program code is stored in the computer-readable storage medium, and when executed by a processing unit or a processor, the computer program code enables a terminal device to perform the method according to the twenty-third aspect.

According to a twenty-ninth aspect, a computer-readable storage medium is provided, where computer program code is stored in the computer-readable storage medium, and when the executed by a processing unit or a processor, the computer program code enables a network device to perform the method according to the twenty-fourth aspect.

According to a thirtieth aspect, a communications chip storing an instruction is provided, where when run on a terminal device, the instruction enables the communications chip to perform the method according to the foregoing twenty-third aspect.

According to a thirty-first aspect, a communications chip storing an instruction is provided, where when run on a network device, the instruction enables the communications chip to perform the method according to the foregoing twenty-fourth aspect.

According to a thirty-second aspect, a computer program product is provided, where the computer program product includes computer program code, and when run by a communications unit or a transceiver, or a processing unit or a processor of a terminal device, the computer program code enables the terminal device to perform the method according to the foregoing twenty-third aspect.

According to a thirty-third aspect, a computer program product is provided, where the computer program product includes computer program code, and when run by a communications unit or a transceiver, or a processing unit or a processor of a network device, the computer program code enables the network device to perform the method according to the foregoing twenty-fourth aspect.

BRIEF DESCRIPTION OF DRAWINGS

FIG. 3 is a schematic diagram of a method for receiving a pilot signal according to this application;

FIG. 4 is a schematic diagram of another method for generating a pilot signal according to this application;

FIG. 5 is a schematic diagram of another method for receiving a pilot signal according to this application;

FIG. 6 is a schematic diagram of still another method for generating a pilot signal according to this application;

DESCRIPTION OF EMBODIMENTS

The following describes technical solutions of this application with reference to accompanying drawings.

Figure 1:
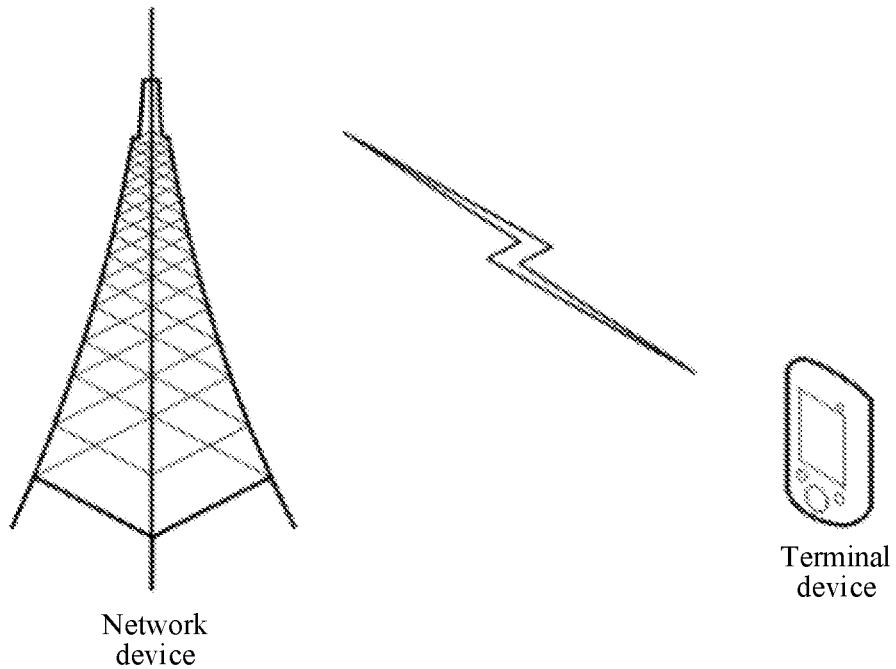
FIG. 1 is a schematic diagram of a communications system applicable to this application.

FIG. 1 shows a communications system applicable to this application. The communications system includes a network device and a terminal device, where the network device and the terminal device communicate with each other by using a wireless network. When the terminal device sends information, a wireless communications module of the terminal device may obtain information bits to be sent to the network device through a channel. These information bits, for example, are information bits that are generated by a processing module of the terminal device, that are received from another device, or that are stored in a storage module of the terminal device.

The terminal device in this application may also be referred to as an access terminal, user equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a handheld device having a wireless communication function, a computing device, another processing device connected to a wireless modem, an in-vehicle device, a wearable device, and user equipment in a 5G system for mobile communications.

The network device may be a base transceiver station (base transceiver station, BTS) in a code division multiple access (CDMA) system, a node B (NB) in a wideband code division multiple access (WCDMA) system, an evolved node B (eNB) in a long term evolution (LTE) system, or a gNB in a 5G communications system, and the foregoing base stations are merely described as examples. The network device may further be a relay station, an access point, an in-vehicle device, a wearable device, or a device of another type.

The foregoing communications systems applicable to this application are merely described as examples. Communications systems applicable to this application are not limited thereto. For example, a quantity of network devices or terminal devices included in a communications system may further be a quantity of other devices.

Figure 2:
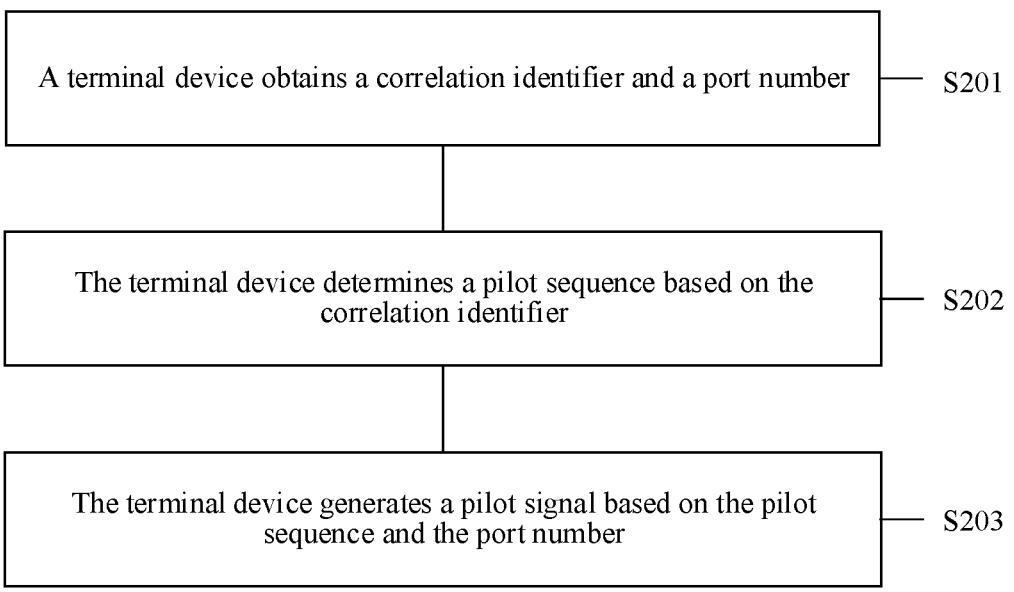
FIG. 2 is a schematic diagram of a method for generating a pilot signal according to this application.

FIG. 2 is a schematic diagram of a method for generating a pilot signal according to this application. The method 200 includes the following steps.

S201. A terminal device obtains a correlation identifier and a port number.

S202. The terminal device determines a pilot sequence based on the correlation identifier.

S203. The terminal device generates the pilot signal based on the pilot sequence and the port number.

The correlation identifier is used to indicate a manner in which the terminal device determines the pilot sequence. The foregoing manner in which the pilot sequence is determined, for example, is a manner in which a pilot sequence is determined and that is correlated with a timeslot, or the foregoing manner in which the pilot sequence is determined may be a manner in which a pilot sequence is determined and that is not correlated with a timeslot. Therefore, a requirement of different application scenarios for correlation between pilot signals may be met. The method for the pilot signal provided in this application may be applied to grant based transmission (including existing grant based transmission, and further including grant based transmission in the 5G system for mobile communications), or may further be applied to grant free transmission in the 5G system for mobile communications. Therefore, the solution provided in this embodiment of this application further has relatively good backward compatibility.

Based on the foregoing description, the correlation identifier is information used to indicate the manner in which the terminal device determines the pilot sequence. Therefore, any information indicating the manner in which the terminal device determines the pilot sequence may be referred to as a correlation identifier, and the information indicating the manner in which the terminal device determines the pilot sequence may also have another name. It should not be understood as a limitation to the scope of protection of this application that this application refers to the information having the foregoing function as the correlation identifier.

In addition to being used to indicate the manner in which the terminal device determines the pilot sequence, optionally, the correlation identifier may further be used as a parameter that calculates an initial value of the pilot sequence, to reduce correlation between a plurality of non-orthogonal pilot sequences.

The network device generates the correlation identifier in an online or offline manner, where the foregoing online manner is a real-time calculation manner, and the foregoing offline manner is a pre-calculation and storage manner.

For example, for a specific bandwidth configuration, the network device has scheduled one or more non-orthogonal pilot sequences. When the network device needs to schedule a new non-orthogonal pilot sequence, the network device attempts to set different values within a value set of the correlation identifier, calculates a new sequence based on the value, calculates correlation between the new sequence and the original sequences (the foregoing scheduled one or more non-orthogonal pilot sequences), selects a sequence having lowest correlation with the original sequences as a new pilot sequence, and sends a correlation identifier corresponding to the new pilot sequence to the terminal device. The sending the correlation identifier corresponding to the new pilot sequence to the terminal device in the foregoing description, for example, is sending a value or a sequence number of the correlation identifier to the terminal device.

After determining, based on the correlation identifier, the manner in which the pilot sequence is determined, the terminal device first calculates an initial value (c_init) of the pilot sequence, then calculates the pilot sequence based on the initial value, and finally generates a corresponding pilot signal based on the port number and the pilot sequence. A method for calculating the initial value of the pilot sequence by the terminal device is described in the following embodiments. For a method for calculating the pilot sequence based on the initial value of the pilot sequence by the terminal device and a method for generating the pilot signal based on the port number and the pilot sequence by the terminal device, refer to corresponding methods in the prior art, and for brevity, details are not described herein again.

In a possible implementation, the terminal device pre-stores a preset value, and that the terminal device determines a pilot sequence based on the correlation identifier includes:

S204. When a value of the correlation identifier is equal to the preset value, the terminal device determines the pilot sequence based on a timeslot number and at least one parameter of an identifier of a cell to which the terminal device belongs, an identifier of the terminal device, and a scramble identifier; or S205. When a value of the correlation identifier is not equal to the preset value, the terminal device determines the pilot sequence based on the correlation identifier and at least one parameter of an identifier of a cell to which the terminal device belongs, an identifier of the terminal device, and a scramble identifier.

In a possible implementation, when the correlation identifier is not equal to the preset value, the terminal device may not determine the pilot sequence by using the correlation identifier, that is, S205 may be replaced with S206.

S206. When the value of the correlation identifier is not equal to the preset value, the terminal device determines the pilot sequence based on at least one parameter of the identifier of the cell to which the terminal device belongs, the identifier of the terminal device, and the scramble identifier.

Due to a limited quantity of orthogonal pilot sequences, a quantity of terminal devices simultaneously in communication with a network device is limited. To increase the quantity of the terminal devices simultaneously in communication with the network device, different terminal devices may use non-orthogonal pilot sequences. To reduce interference that is between the terminal devices and that is brought by the non-orthogonal pilot sequences, correlation between the non-orthogonal pilot sequences needs to be reduced to the greatest extent. In the prior art, a timeslot number is one of parameters that generate the pilot sequence, and the generated pilot sequence jumps over the timeslot number. If this generation manner in the prior art is still used, low correlation between the non-orthogonal pilot sequences that are used by a plurality of terminal devices cannot be ensured. Therefore, when the pilot sequence is used, use of the timeslot number as a parameter that generates the pilot sequence is avoided, so that relatively low correlation between pilot sequences used by the plurality of terminal devices may be ensured.

The foregoing preset value may be a value specified by a communication protocol, or may be a value configured by the network device to the terminal device, and in the following description, X represents the preset value.

When the value of the correlation identifier is equal to X (x=1), the terminal device may calculate the initial value of the pilot sequence based on a formula in formula (1) to formula (3).

$$c\_init=(floor(timeslot\ number/2)+1)*(2*cell\ identifier+1)*2^P+scramble\ identifier\ index \quad (1)$$

$$c\_init=(floor(timeslot\ number/2)+1)*(2*scramble\ identifier+1)*2^P+scramble\ identifier\ index \quad (2)$$

$$c\_init=(floor(timeslot\ number/2)+1)*(2*terminal\ identifier+1)*2^P+scramble\ identifier\ index \quad (3)$$

In the foregoing formulas, floor represents an operation of rounding down, $2^P$ represents a $p^{th}$ power of 2, and p is an integer, where 1≤p≤31. For example, a value of p may be 5 or 16.

The timeslot number is a sequence number of a current timeslot used to send a signal in an entire radio frame, the cell identifier is the identifier of the cell to which the terminal device belongs, the terminal identifier is the identifier of the terminal device, and the terminal identifier may be generated based on a cell radio network temporary identifier (C-RNTI), or may be generated based on the C-RNTI and the cell identifier.

For the scramble identifier, the network device may directly configure a value of the scramble identifier through RRC signaling, or the network device may indicate the scramble identifier in the following manner: The terminal device and the network device both pre-store a scramble identifier (scramble ID) table, where the scramble identifier table includes a plurality of scramble identifiers, and the network device indicates, by using DCI or a MAC CE, one or more scramble identifiers in the scramble identifier table for calculating the initial value of the pilot sequence.

When a scramble identifier is specified among the configured plurality of scramble identifiers to generate a pilot sequence of the terminal device, the foregoing scramble identifier index may be a sequence number of the specified scramble identifier among the plurality of scramble identifiers. For example, when two scramble identifiers are configured, by using the RRC message, for generating a pilot sequence of the terminal device, the terminal device may obtain, by using the DCI or the MAC CE, the sequence number of the scramble identifier used to determine the pilot sequence, the sequence number of the scramble identifier may be 0 or 1, and the terminal device determines, based on the sequence number, the scramble identifier used to determine the pilot sequence. When two or more scramble identifiers are configured, by using the RRC message, for generating a pilot sequence of the terminal device, but a system does not support notifying, through other signaling, the terminal device of the scramble identifier to be selected to determine the pilot sequence, the scramble identifier index is a default value, for example, 0. When only one scramble identifier is configured, by using the RRC message, for generating a pilot sequence of the terminal device, a scramble identifier index is a default value, for example, 0. In addition, if a current communication scenario does not support transmitting a pilot parameter (including the scramble identifier) by using the DCI or the MAC CE, or before the network device configures the scramble identifier for the terminal device, the foregoing scramble identifier is the default value, for example, 0.

In the following, if there is no specific description, meanings of the floor, $2^P$, the timeslot number, the cell identifier, the terminal identifier, the scramble identifier, and the scramble identifier index are the same as meanings of the corresponding parameters in the foregoing formulas.

When the value of the correlation identifier is not equal to X, the terminal device may calculate the initial value of the pilot sequence based on a formula of formula (4) to formula (12).

$$c\_init=(correlation\ identifier+1)*(2*cell\ identifier+1)*2^P+scramble\ identifier\ index \quad (4)$$

$$c\_init=(2*cell\ identifier+1)*2^P+correlation\ identifier+scramble\ identifier\ index \quad (5)$$

$$c\_init=(2*cell\ identifier+1)*2^P+scramble\ identifier\ index \quad (6)$$

$$c\_init=(correlation\ identifier+1)*(2*terminal\ identifier+1)*2^P+scramble\ identifier\ index \quad (7)$$

$$c\_init=(2*terminal\ identifier+1)*2^P+correlation\ identifier+scramble\ identifier\ index \quad (8)$$

$$c\_init=(2*terminal\ identifier+1)*2^P+scramble\ identifier\ index \quad (9)$$

$$c\_init=(correlation\ identifier+1)*(2*scramble\ identifier+1)*2^P+scramble\ identifier\ index \quad (10)$$

$$c\_init=(2*scramble\ identifier+1)*2^P+correlation\ identifier+scramble\ identifier\ index \quad (11)$$

$$c\_init=(2*scramble\ identifier+1)*2^P+scramble\ identifier\ index \quad (12)$$

After calculating the initial value of the pilot sequence, the terminal device may calculate the pilot sequence, and generate the pilot signal based on the pilot sequence and the port number.

It should be understood that in this application, "when" indicates that the terminal device or the network device performs corresponding processing in an objective case, does not limit time, does not require that when implementing a corresponding function, the terminal device or the network device has to perform a determining action, and does not mean that there are other limitations.

In a possible implementation, that the terminal device determines a pilot sequence based on the correlation identifier includes:

determining, by the terminal device, the pilot sequence based on the correlation identifier and the at least one parameter of the identifier of the cell to which the terminal device belongs, the identifier of the terminal device, and the scramble identifier. For example, the pilot sequence is determined based on any one of formulas (4), (5), (7), (8), (10), and (11).

In another embodiment of this application, the initial value of the pilot sequence may further be obtained through calculation based on at least one of the following manners.

Manner 1:

$$c\_init=(\text{correlation identifier}*\text{timeslot number}+1)*(2*\text{cell identifier}+1)*2^P+\text{scramble identifier index} \quad (15).$$

Manner 2:

$$c\_init=(\text{correlation identifier}*\text{timeslot number}+1)*(2*\text{terminal identifier}+1)*2^P+\text{scramble identifier index} \quad (16).$$

Manner 3:

$$c\_init=(\text{correlation identifier}*\text{timeslot number}+1)*(2*\text{scramble identifier}+1)*2^P+\text{scramble identifier index} \quad (17).$$

Manner 4:

$$c\_init=(\text{correlation identifier}*\text{timeslot number}+1)*(2*Y+1)*2^P+\text{scramble identifier index} \quad (18).$$

Manner 5:
when the value of the correlation identifier is 0, $$c\_init=(2*Y+1)*2^P+\text{scramble identifier index} \quad (19);$$

or
when the value of the correlation identifier is 1, $$c\_init=(\text{timeslot number}+1)*(2*Y+1)*2^P+\text{scramble identifier index} \quad (20),$$

where
a variable Y may be the cell identifier, the terminal identifier, or the scramble identifier.

Manner 6:

$$c\_init=(\text{correlation identifier}*(14*(\text{timeslot number}+1)+\text{sequence number of a symbol})+1)*(2*Y+1)*2^P+\text{scramble identifier index} \quad (21).$$

Manner 7:
when the value of the correlation identifier is 0, $$c\_init=(2*Y+1)*2^P+\text{scramble identifier index} \quad (22);$$

or
when the value of the correlation identifier is 1, $$c\_init=(14*(\text{timeslot number}+1)+\text{sequence number of a symbol}+1)*(2*Y+1)*2^P+\text{scramble identifier index} \quad (23).$$

In the foregoing manners, Y may be the cell identifier, the terminal identifier, or the scramble identifier, and the sequence number of the symbol is a sequence number of a symbol at which a current pilot is located.

In an embodiment, when any one of formulas (15) to (18), and (21) is used to calculate the initial value of the pilot sequence, the value of the correlation identifier may be 0 or 1.

In an embodiment, when X=1 in the foregoing embodiment, and the value of the correlation identifier is 0, initial values of the pilot sequence that are obtained through calculation based on formulas (6), (9), and (12) are respectively the same as initial values of the pilot sequence that are obtained through calculation based on formulas (15), (16), and (17).

In an embodiment, when the value of the correlation identifier is 1,
formula (15) is specifically: c_init=(timeslot number+1)*(2*cell identifier+1)*$2^P$+scramble identifier index;
formula (16) is specifically: c_init=(timeslot number+1)*(2*terminal identifier+1)*$2^P$+scramble identifier index; and
formula (17) is specifically: c_init=(timeslot number+1)*(2*scramble identifier+1)*$2^P$+scramble identifier index.

In a possible implementation, before the terminal device determines the pilot sequence based on the correlation identifier, the method 200 further includes the following step.

S207. The terminal device receives the RRC message, where the RRC message includes configuration information of the scramble identifier.

The foregoing configuration information may be a specific value of the scramble identifier, or may be the scramble identifier index. When the configuration information is the scramble identifier index, the terminal device and the network device both store a scramble identifier table, and the scramble identifier index is used to indicate the scramble identifier that is in the scramble identifier table and that is to be used by the terminal device to calculate the initial value of the pilot sequence.

Compared with a method, in the prior art, for indicating, jointly by the RRC message and the DCI, a scramble identifier used by the terminal device, this embodiment reduces signaling overheads.

In a possible implementation, the RRC message includes configuration information of a plurality of scramble identifiers, and the method 200 further includes the following step.

S208. The terminal device receives the DCI, where the DCI includes the scramble identifier index, and the scramble identifier index is used to indicate a scramble identifier used to determine the pilot sequence among the plurality of scramble identifiers.

In this embodiment, the terminal device determines the pilot sequence and generates the pilot signal based on a scramble identifier specified by the network device, and correlation between the generated pilot sequence and a pilot sequence generated by another terminal device may be further reduced.

In a possible implementation, when determining the pilot sequence, the terminal device uses a scramble identifier associated with a timeslot at which the pilot signal is located as a parameter that determines the pilot sequence.

In the solution provided in this embodiment, the scramble identifier and the timeslot number are associated with each other, and scramble identifiers associated with different timeslot numbers may be different, or may be the same (whether the scramble identifiers are the same is specifically specified by a standard or determined by the network device). When a pilot sequence of a specific timeslot is determined, only a scramble identifier associated with (corresponding to) a timeslot number of the timeslot can be used. An effect of the scramble identifier is to offset a negative impact caused by a timeslot number change on correlation between pilot signals. In this way, even if the timeslot number changes, the correlation between pilot signals that are generated based on the timeslot number and a correlation identifier corresponding to the timeslot number still meets a transmission requirement. When the method is applied to a scenario in which pilot signals sent by a plurality of terminal devices are not completely orthogonal, interference between the plurality of terminal devices may be reduced.

In a possible implementation, when determining the pilot sequence, the terminal device further uses a cyclic shift value as a parameter that determines the pilot sequence. Based on the cyclic shift value, the terminal device performs cyclic shift processing on an initial value that is of the pilot sequence and that is obtained through calculation based on any one of formulas (1) to (12) and (15) to (23), to obtain a target pilot sequence, that is, a pilot sequence used to generate the pilot signal.

A plurality of pilot sequences may be generated by performing cyclic shift processing on a pilot sequence, thereby meeting a demand of grant free transmission for pilot signals.

In a possible implementation, before the terminal device determines the pilot sequence based on the cyclic shift value and the correlation identifier, the method 200 further includes the following step.

S209. The terminal device receives the RRC message, the DCI, or the MAC CE, where the RRC message, the DCI, or the MAC CE includes a cyclic shift value index.

The following is an example in which the pilot sequence is determined based on the cyclic shift value.

The pilot sequence calculated by the terminal device based on the initial value is $x(n)$, and based on the cyclic shift value index in the received RRC message, DCI, or MAC CE, the terminal device determines the cyclic shift value used to perform the cyclic shift processing. The terminal device and the network device both store a cyclic shift value set including a plurality of cyclic shift values, and the foregoing cyclic shift value index indicates the cyclic shift value that is in the cyclic shift value set and that is used to perform cyclic shift processing.

When the cyclic shift value found based on the cyclic shift value index is a, the following processing is performed on $x(n)$:

$$y(n)=\exp(j*\alpha*n)*x(n), \text{ where}$$

$y(n)$ represents the pilot sequence obtained through the cyclic shift processing, exp represents an exponential function with a natural constant e as a base, and j represents an imaginary unit, that is, $j=\text{sqrt}(-1)$.

In a possible implementation, that a terminal device obtains a correlation identifier and a port number includes:

S210. The terminal device obtains the correlation identifier and the port number based on the received RRC message; or S211. The terminal device obtains the correlation identifier based on the received RRC message.

S212. The terminal device obtains the port number based on the received DCI; or

S213. The terminal device obtains the correlation identifier and the port number based on the received DCI.

The foregoing describes, from a perspective of the terminal device, the method for generating a pilot signal provided in this application, and the following will describe in detail, from a perspective of the network device, the method for receiving a pilot signal provided in this application.

FIG. 3 is a schematic diagram of a method for receiving a pilot signal according to this application. The method 300 includes the following steps.

S301. A network device sends a correlation identifier and a port number to a terminal device, where the correlation identifier and the port number are used to generate the pilot signal.

S302. The network device receives the pilot signal from the terminal device.

The correlation identifier is used to indicate a manner in which the terminal device determines a pilot sequence. The foregoing manner in which the pilot sequence is determined, for example, is a manner in which a pilot sequence is determined and that is correlated with a timeslot, or the foregoing manner in which the pilot sequence is determined may be a manner in which a pilot sequence is determined and that is not correlated with a timeslot. Therefore, a requirement of different application scenarios for correlation between pilot signals may be met. The method for the pilot signal provided in this application may be applied to grant based transmission (including existing grant based transmission, and further including grant based transmission in a 5G system for mobile communications), or may be applied to grant free transmission in the 5G system for mobile communications. Therefore, the solution provided in this embodiment of this application further has relatively good backward compatibility.

The correlation identifier may be a value selected within a specific value set. For example, a value set A corresponds to the grant free transmission, and a value set B corresponds to the grant based transmission. When the terminal device is in a grant free transmission mode, the network device may select a value from the value set A as the correlation identifier, and sends the correlation identifier to the terminal device. When the terminal device is in a grant based transmission mode, the network device may select a value from the value set B as the correlation identifier, and sends the correlation identifier to the terminal device.

The pilot signal may be generated based on the port number and the pilot sequence, the pilot sequence may be obtained through calculation based on a pilot parameter (for example, a scramble identifier), and it should be noted that, that the correlation identifier in S301 is used to generate the pilot signal does not mean that the correlation identifier needs to be the pilot parameter that calculates the pilot sequence, and the correlation identifier may further participate in, as a piece of indication information, a process of calculating the pilot sequence.

A person skilled in the art may clearly learn of that, in the method 300, the network device may be equivalent to the network device in the method 200, the correlation identifier and the method for determining the pilot sequence based on the correlation identifier may both be equivalent to the correlation identifier and the method for determining the pilot sequence based on the correlation identifier in the method 200, and for brevity, details are not described herein again.

In a possible implementation, the network device and the terminal device pre-store a preset value.

When a value of the correlation identifier is equal to the preset value, the correlation identifier is used to instruct the terminal device to generate the pilot signal in a first pattern; or when a value of the correlation identifier is not equal to the preset value, the correlation identifier is used to instruct the terminal device to generate the pilot signal in a second pattern.

The first pattern, for example, is a manner in which the pilot signal is generated based on a timeslot number, and in the pattern, the timeslot number is one of parameters that generate the pilot signal. The second pattern, for example, is a manner in which the pilot signal is generated and that is not correlated with a timeslot number, and in the pattern, the timeslot number is not a parameter that generates the pilot signal. When the terminal device transmits data in a grant based manner, a demand of a communications system for pilot signals is relatively small, and the network device may instruct the terminal device to generate the pilot signal based on the method for generating the pilot signal in the first pattern; and when the terminal device transmits data in a grant free transmission manner, the demand of the communications system for the pilot signals is relatively large, and the network device may instruct the terminal device to generate the pilot signal based on the method for generating the pilot signal in the second pattern. Therefore, the method for generating the pilot signal by the terminal device may be determined based on a current transmission manner of the terminal device.

In a possible implementation, that a network device sends a correlation identifier and a port number to a terminal device includes:

S303. The network device sends an RRC message to the terminal device, where the RRC message includes the correlation identifier and the port number; or S304. The network device sends an RRC message to the terminal device, where the RRC message includes information about the correlation identifier, and S305. The network device sends DCI to the terminal device, where the DCI includes the port number.

This embodiment provides a plurality of methods for sending the correlation identifier and the port number, thereby improving flexibility and reliability of obtaining, by the terminal device, the correlation identifier and the port number.

The foregoing describes the method for generating, by the terminal device, the pilot signal based on the correlation identifier, and the method for receiving, by the network device, the pilot signal based on the correlation identifier. The foregoing methods may be applied to a scenario in which the grant free transmission and the grant based transmission coexist. However, there may only be a requirement of the grant free transmission in some scenarios. Therefore, the correlation identifier is insignificant in these scenarios, and when the solution for generating the pilot signal is designed, the correlation identifier may be neglected to reduce complexity of the solution.

FIG. 4 shows another method for generating a pilot signal according to this application. The method 400 includes the following steps.

S401. A terminal device receives an RRC message, DCI, or a MAC CE, where the RRC message, the DCI, or the MAC CE includes a port number, and the RRC message further includes at least one of a scramble identifier, an identifier of a cell to which the terminal device belongs, and an identifier of the terminal device.

S402. The terminal device determines a pilot sequence based on the at least one identifier of the scramble identifier, the identifier of the cell to which the terminal device belongs, and the identifier of the terminal device.

S403. The terminal device generates the pilot signal based on the pilot sequence and the port number.

In the foregoing method for generating the pilot signal, the pilot signal does not need to be generated based on a timeslot number, and the pilot signal no longer jumps over time. Therefore, correlation between pilot signals generated by different terminal devices is reduced. When the method is applied to a scenario in which pilot signals sent by a plurality of terminal devices are not completely orthogonal, interference between the plurality of terminal devices may be reduced.

The following is an example in which the pilot signal is generated.

The terminal device first calculates an initial value of the pilot sequence based on the scramble identifier, where a calculation formula is shown in formula (13), that is, $$c\_init=(2*\text{scramble identifier}+1)*2^{16} \quad (13)$$

and then calculates the pilot sequence based on the initial value, and further generates the pilot signal based on the port number.

Another two embodiments may be obtained by replacing the scramble identifier in formula (13) with a cell identifier or a terminal identifier.

In a possible implementation, when determining the pilot sequence, the terminal device further uses a cyclic shift value as a parameter that determines the pilot sequence.

A plurality of pilot sequences may be generated by performing cyclic shift processing on a pilot sequence, thereby meeting a demand of grant free transmission for pilot signals.

In a possible implementation, the RRC message includes configuration information of a cyclic shift value.

The configuration information may be a specific cyclic shift value, or may be a cyclic shift value index.

For a method for obtaining the cyclic shift value by the terminal device, and a method for performing cyclic shift processing on the pilot sequence by the terminal device in the method 400, refer to relevant description in the method 200, and for brevity, details are not described herein again.

FIG. 5 shows another method for receiving a pilot signal according to this application. The method 500 includes the following steps.

S501. A network device sends an RRC message, DCI, or a MAC CE, where the RRC message, the DCI, or the MAC CE includes a port number, and the RRC message, the DCI, or the MAC CE further includes at least one of a scramble identifier, an identifier of a cell to which a terminal device belongs, and an identifier of the terminal device, where the port number and the at least one identifier of the scramble identifier, the identifier of the cell to which the terminal device belongs, and the identifier of the terminal device are used to generate the pilot signal.

S502. The network device receives the pilot signal.

In the foregoing method for generating the pilot signal, the pilot signal does not need to be generated based on a timeslot number, and the pilot signal no longer jumps over time. Therefore, correlation between pilot signals generated by different terminal devices is reduced. When the method is applied to a scenario in which pilot signals sent by a plurality of terminal devices are not completely orthogonal, interference between the plurality of terminal devices may be reduced.

The pilot signal may be generated based on the port number and a pilot sequence, where the pilot sequence may be obtained through calculation based on a pilot parameter (for example, the scramble identifier, the identifier of the cell to which the terminal device belongs, or the identifier of the terminal device). For a specific calculation method, refer to the method for calculating the pilot sequence in the method 400, and for brevity, details are not described herein again.

In a possible implementation, the RRC message further includes configuration information of a cyclic shift value, where the cyclic shift value is used to generate the pilot signal.

A plurality of pilot sequences may be generated by performing cyclic shift processing on a pilot sequence, thereby meeting a demand of grant free transmission for pilot signals.

For a method for using the cyclic shift value in the method 500, refer to description on the cyclic shift processing in the method 200, and for brevity, details are not described herein again.

FIG. 6 shows still another method for generating a pilot signal according to this application. The method 600 includes the following steps.

S601. A terminal device receives an RRC message, DCI, or a MAC CE, where the RRC message, the DCI, or the MAC CE includes a port number and a plurality of scramble identifiers.

S602. The terminal device determines a pilot sequence based on a timeslot number, and a scramble identifier corresponding to the timeslot number among the plurality of scramble identifiers.

S603. The terminal device generates the pilot signal based on the pilot sequence and the port number.

In the solution provided in this embodiment, the scramble identifier and the timeslot number are associated with each other, and scramble identifiers associated with different timeslot numbers may be different, or may be the same (whether the scramble identifiers are the same is specifically specified by a standard or determined by the network device). When a pilot sequence of a specific timeslot is determined, only a scramble identifier associated with (corresponding to) a timeslot number of the timeslot can be used. An effect of the scramble identifier is to offset a negative impact caused by a timeslot number change on correlation between pilot signals. In this way, even if the timeslot number changes, the correlation between pilot signals that are generated based on the timeslot number and a correlation identifier corresponding to the timeslot number still meets a transmission requirement. When the method is applied to a scenario in which pilot signals sent by a plurality of terminal devices are not completely orthogonal, interference between the plurality of terminal devices may be reduced.

The following is an example in which the pilot signal is generated.

The terminal device first calculates an initial value of the pilot sequence based on the scramble identifier, where a calculation formula is shown in formula (14), that is, $$c\_init=(floor(timeslot\ number/2)+1)*(2*scramble\ identifier+1)*2^P+scramble\ identifier\ index \quad (14)$$

and then calculates the pilot sequence based on the initial value, and further generates the pilot signal based on the port number.

In formula (14), the scramble identifier is a scramble identifier corresponding to the timeslot number among the plurality of scramble identifiers that are configured in S601.

In a possible implementation, when determining the pilot sequence, the terminal device further uses a cyclic shift value as a parameter that determines the pilot sequence.

A plurality of pilot sequences may be generated by performing cyclic shift processing on a pilot sequence, thereby meeting a demand of grant free transmission for pilot signals.

In a possible implementation, the RRC message includes configuration information of the cyclic shift value.

The configuration information may be a specific cyclic shift value, or may be a cyclic shift value index.

For a method for obtaining the cyclic shift value by the terminal device and a method for performing cyclic shift processing on the pilot sequence by the terminal device in the method 600, refer to relevant description in the method 200, and for brevity, details are not described herein again.

Figures 7, 8:
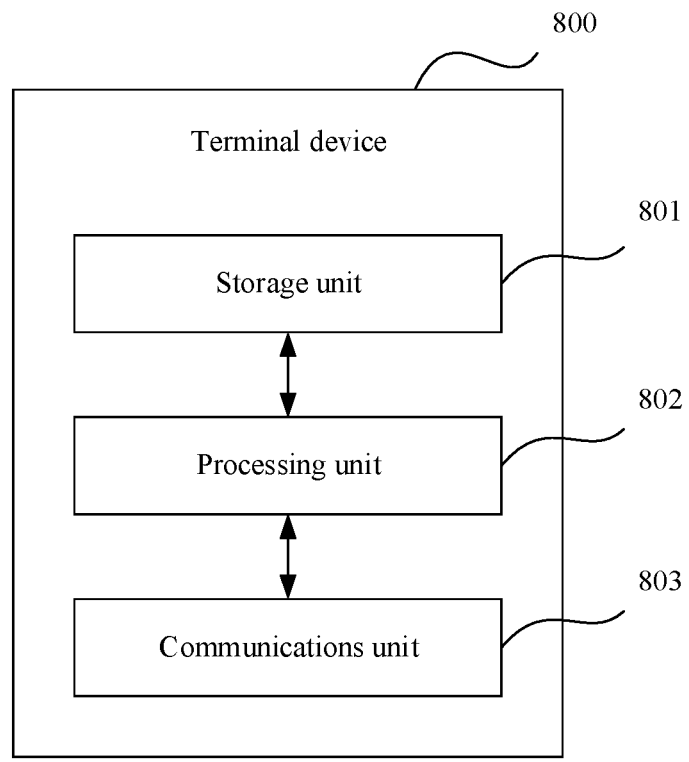
FIG. 7 is a schematic diagram of still another method for receiving a pilot signal according to this application.
FIG. 8 is a schematic diagram of a possible terminal device according to this application.

FIG. 7 shows still another method for receiving a pilot signal according to this application. The method 700 includes the following steps.

S701. The network device sends an RRC message, DCI, or a MAC CE, where the RRC message, the DCI, or the MAC CE includes a port number and a plurality of scramble identifiers, the plurality of scramble identifiers have a one-to-one correspondence with a plurality of timeslot numbers, and the port number, the plurality of scramble identifiers, and the plurality of timeslot numbers are used to generate the pilot signal.

S702. The network device receives the pilot signal.

In the solution provided in this embodiment, the scramble identifier and the timeslot number are associated with each other, and scramble identifiers associated with different timeslot numbers may be different, or may be the same (whether the scramble identifiers are the same is specifically specified by a standard or determined by the network device). When a pilot sequence of a specific timeslot is determined, only a scramble identifier associated with (corresponding to) a timeslot number of the timeslot can be used. An effect of the scramble identifier is to offset a negative impact caused by a timeslot number change on correlation between pilot signals. In this way, even if the timeslot number changes, the correlation between pilot signals that are generated based on the timeslot number and a correlation identifier corresponding to the timeslot number still meets a transmission requirement. When the method is applied to a scenario in which pilot signals sent by a plurality of terminal devices are not completely orthogonal, interference between the plurality of terminal devices may be reduced.

In a possible implementation, the RRC message further includes configuration information of a cyclic shift value, where the cyclic shift value is used to generate the pilot signal.

A plurality of pilot sequences may be generated by performing cyclic shift processing on a pilot sequence, thereby meeting a demand of grant free transmission for pilot signals.

For a method for using the cyclic shift value in the method 700, refer to description on the cyclic shift processing in the method 200, and for brevity, details are not described herein again.

In an embodiment, the terminal device may need to generate a plurality of pilot signals, where the plurality of pilot signals may be used to transmit a plurality of code words in a timeslot, and pilot signals used when all code words are transmitted are different. The plurality of pilot signals may further be transmitted in different timeslots, and the terminal device uses different pilot signals based on types of the timeslots, for example, a timeslot used during initial transmission and a timeslot used during retransmission. The method for generating the plurality of pilot signals by the terminal device is the same as the methods in the foregoing embodiments. However, a plurality of sets of parameters used to generate the plurality of pilot signals may be obtained in a same RRC message, same DCI, or a same MAC CE, and each set of the parameters corresponds to generation of one pilot signal. The foregoing describes, in detail, examples of the method for generating a pilot signal and a method for receiving the pilot signal provided in this application. It may be understood that to implement the foregoing functions, the terminal device and the network device include corresponding hardware structures and/or software modules for performing the functions. A person skilled in the art should easily be aware that, in combination with the examples described in the embodiments disclosed in this specification, units, and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional unit division may be performed on the terminal device and the network device based on the foregoing method examples. For example, each functional unit may be divided corresponding to each function, or two or more functions may be integrated into one processing unit. The foregoing integrated unit may be implemented in a form of hardware, or may be implemented in a form of a software functional unit. It should be noted that the unit division in this application is an example, and is merely a logical function division. There may be another division manner during actual implementation.

When the integrated unit is used, FIG. 8 is a possible schematic structural diagram of the terminal device in the foregoing embodiments. A terminal device 800 includes a processing unit 802 and a communications unit 803. The processing unit 802 is configured to control and manage actions of the terminal device 800. For example, the processing unit 802 is configured to support the terminal device 800 in performing each step in FIG. 2, and/or is used in another process of the technology described in this specification. The communications unit 803 is configured to support the terminal device 800 in communicating with another communications device, for example, sending a pilot signal generated by the processing unit 802 to the network device. The terminal device 800 may further include a storage unit 801, configured to store program code and data of the terminal device 800.

For example, the processing unit 802 obtains a correlation identifier and a port number through the communications unit 803. The processing unit 802 is further configured to: determine a pilot sequence based on the correlation identifier; and generate the pilot signal based on the pilot sequence and the port number.

The processing unit 802 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processing unit 802 may implement or execute various example logical blocks, modules, and circuits described with reference to content disclosed in this application. The processor may be a combination implementing a computing function, for example, a combination of one or more microprocessors, or a combination of the DSP and a microprocessor. The communications unit 803 may be a transceiver, a transceiver circuit, or the like. The storage unit 801 may be a memory.

Figure 9:
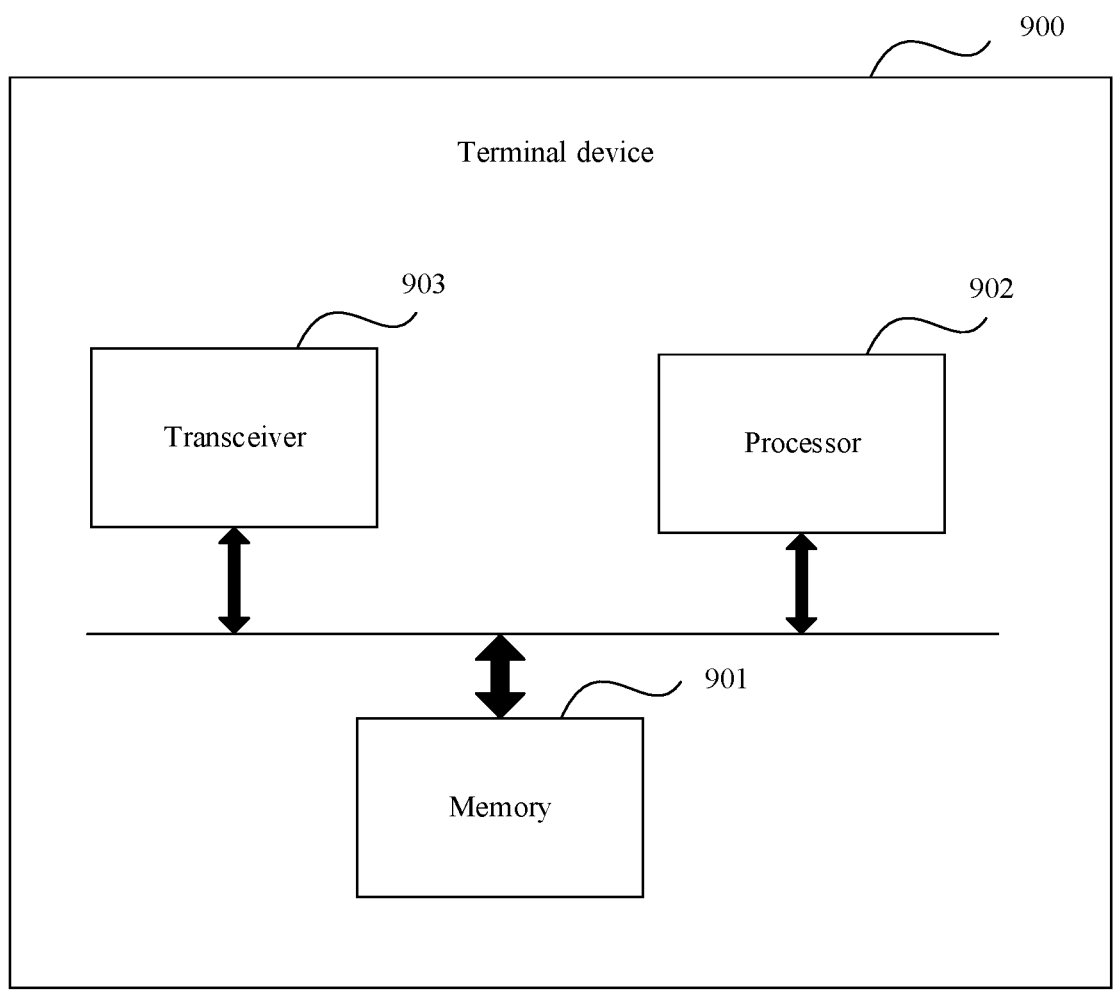
FIG. 9 is a schematic diagram of another possible terminal device according to this application.

When the processing unit 802 is a processor, the communications unit 803 is a transceiver, and the storage unit 801 is a memory, the terminal device in this application may be a terminal device shown in FIG. 9.

As shown in FIG. 9, the terminal device 900 includes a processor 902, a transceiver 903, and a memory 901. The transceiver 903, the processor 902, and the memory 901 may communicate with each other, and transfer a control and/or data signal by using an internal connection channel.

It may be clearly understood by a person of skill in the art that, for ease and brief description, a detailed working process of the foregoing apparatus and units may refer to a corresponding process in the foregoing method embodiments, and details are not described herein again.

The terminal device 800 and the terminal device 900 provided in this application may meet requirements of different transmission manners for correlation between pilot signals, may be applied to grant based transmission (including existing grant based transmission, and further including grant based transmission in a 5G system for mobile communications), or may further be applied to grant free transmission in the 5G system for mobile communications. Therefore, the terminal device 800 and the terminal device 900 have relatively good backward compatibility.

Figure 10:
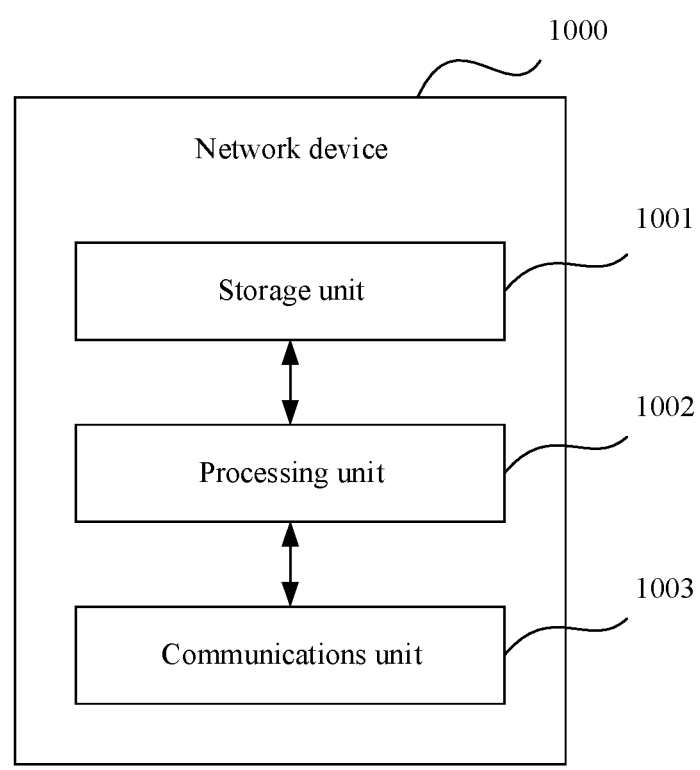
FIG. 10 is a schematic diagram of a possible network device according to this application.

When an integrated unit is used, FIG. 10 is a possible schematic structural diagram of the network device in the foregoing embodiments. A network device 1000 includes a processing unit 1002 and a communications unit 1003. The processing unit 1002 is configured to control and manage actions of the network device 1000. For example, the processing unit 1002 is configured to support the network device 1000 in performing each step in FIG. 3, and/or is used in another process of the technology described in this specification. The communications unit 1003 is configured to support the network device 1000 in communicating with another communications device, for example, receiving a pilot signal sent by a terminal device. The network device 1000 may further include a storage unit 1001, configured to store program code and data of the network device 1000.

For example, the communications unit 1003 performs: sending the correlation identifier and the port number, where the correlation identifier and the port number are used to generate the pilot signal; and receiving the pilot signal from the terminal device.

The processing unit 1002 performs: determining the correlation identifier and a port number for the terminal device.

The processing unit 1002 may be a processor or a controller, and for example, may be a CPU, a general-purpose processor, a DSP, an ASIC, an FPGA, or another programmable logic device, a transistor logic device, a hardware component, or any combination thereof. The processing unit 1002 may implement or execute various example logical blocks, modules, and circuits described with reference to content disclosed in this application. The processor may be a combination implementing a computing function, for example, a combination of one or more microprocessors, or a combination of the DSP and a microprocessor. The communications unit 1003 may be a transceiver, a transceiver circuit, or the like. The storage unit 1001 may be a memory.

Figure 11:
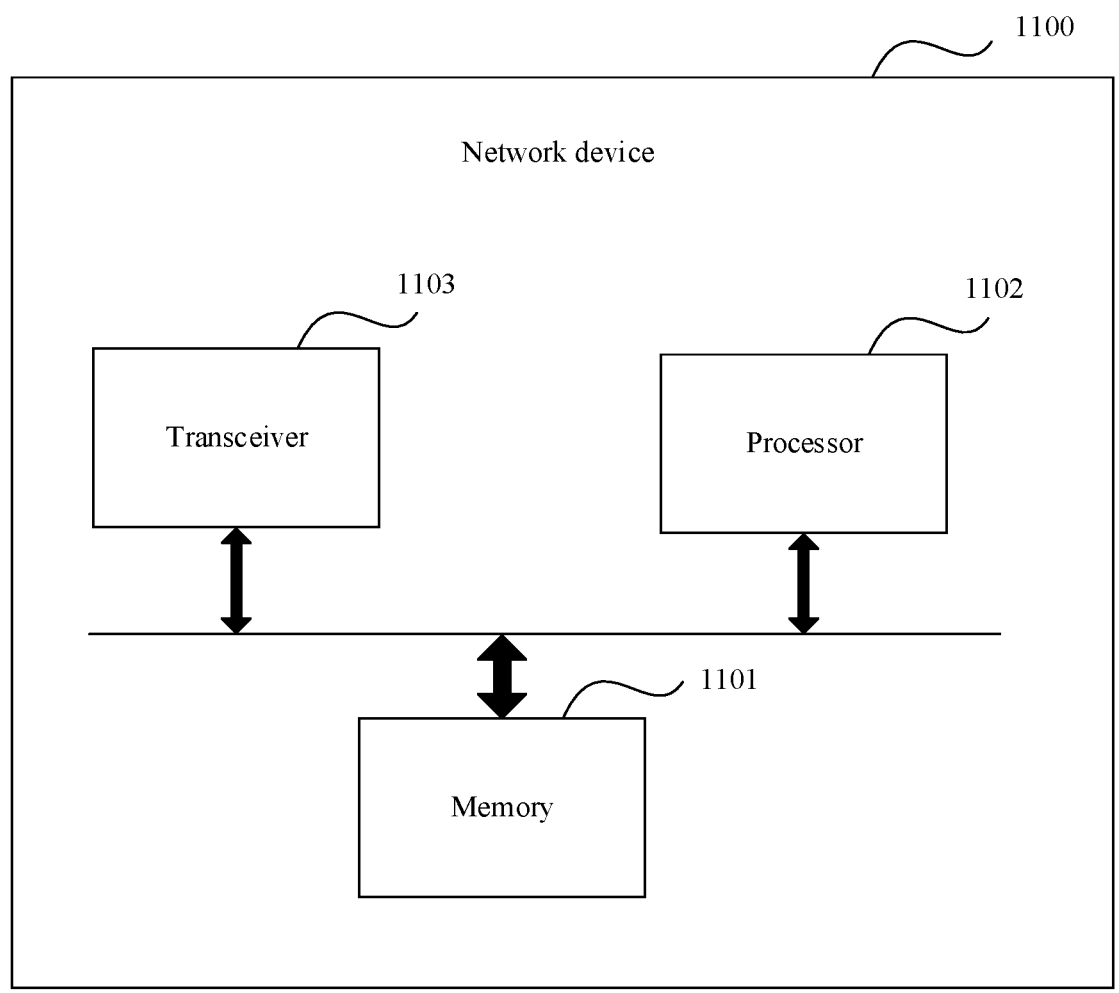
FIG. 11 is a schematic diagram of another possible network device according to this application.

When the processing unit 1002 is a processor, the communications unit 1003 is a transceiver, and the storage unit 1001 is a memory, the network device in this application may be a network device shown in FIG. 11.

As shown in FIG. 11, the network device 1100 includes a processor 1102, a transceiver 1103, and a memory 1101. The transceiver 1103, the processor 1102, and the memory 1101 may communicate with each other, and transfer a control and/or data signal by using an internal connection channel.

It may be clearly understood by a person of skill in the art that, for ease and brief description, a detailed working process of the foregoing apparatus and units may refer to a corresponding process in the foregoing method embodiments, and details are not described herein again.

The network device 1000 and the network device 1100 provided in this application may meet requirements of different transmission manners for correlation between pilot signals, may be applied to grant based transmission (including existing grant based transmission, and further including grant based transmission in a 5G system for mobile communications), or may further be applied to grant free transmission in the 5G system for mobile communications. Therefore, the network device 1000 and the network device 1100 have relatively good backward compatibility.

Figure 12:
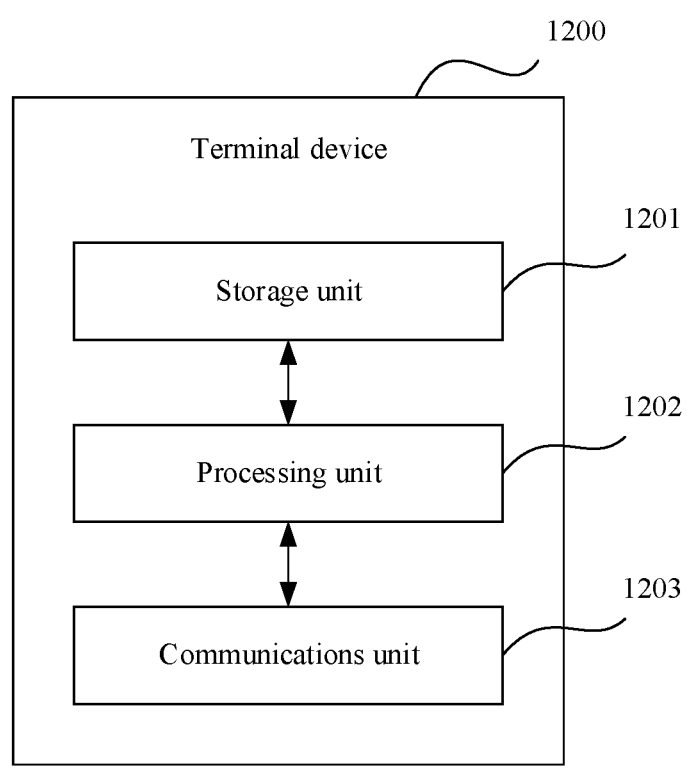
FIG. 12 is a schematic diagram of still another possible terminal device according to this application.

When the integrated unit is used, FIG. 12 is a possible schematic structural diagram of the terminal device in the foregoing embodiments. A terminal device 1200 includes a processing unit 1202 and a communications unit 1203. The processing unit 1202 is configured to control and manage actions of the terminal device 1200. For example, the processing unit 1202 is configured to support the terminal device 1200 in performing each step in FIG. 4, and/or is used in another process in the technology described in this specification. The communications unit 1203 is configured to support the terminal device 1200 in communicating with another communications device, for example, sending a pilot signal generated by the processing unit 1202 to a network device. The terminal device 1200 may further include a storage unit 1201, configured to store program code and data of the terminal device 1200.

For example, the communications unit 1203 performs: receiving an RRC message, DCI, or a MAC CE, where the RRC message, the DCI, or the MAC CE includes a port number, and the RRC message further includes at least one of a scramble identifier, an identifier of a cell to which the terminal device belongs, and an identifier of the terminal device.

The processing unit 1202 is further configured to perform: determining a pilot sequence based on one identifier of the scramble identifier, the identifier of the cell to which the terminal device belongs, and the identifier of the terminal device; and generating the pilot signal based on a pilot sequence and the port number.

The processing unit 1202 may be a processor or a controller, and for example, may be a CPU, a general-purpose processor, a DSP, an ASIC, an FPGA, or another programmable logic device, a transistor logic device, a hardware component, or any combination thereof. The processing unit 1202 may implement or execute various example logical blocks, modules, and circuits described with reference to content disclosed in this application. The processor may be a combination implementing a computing function, for example, a combination of one or more microprocessors, or a combination of the DSP and a microprocessor. The communications unit 1203 may be a transceiver, a transceiver circuit, or the like. The storage unit 1201 may be a memory.

Figure 13:
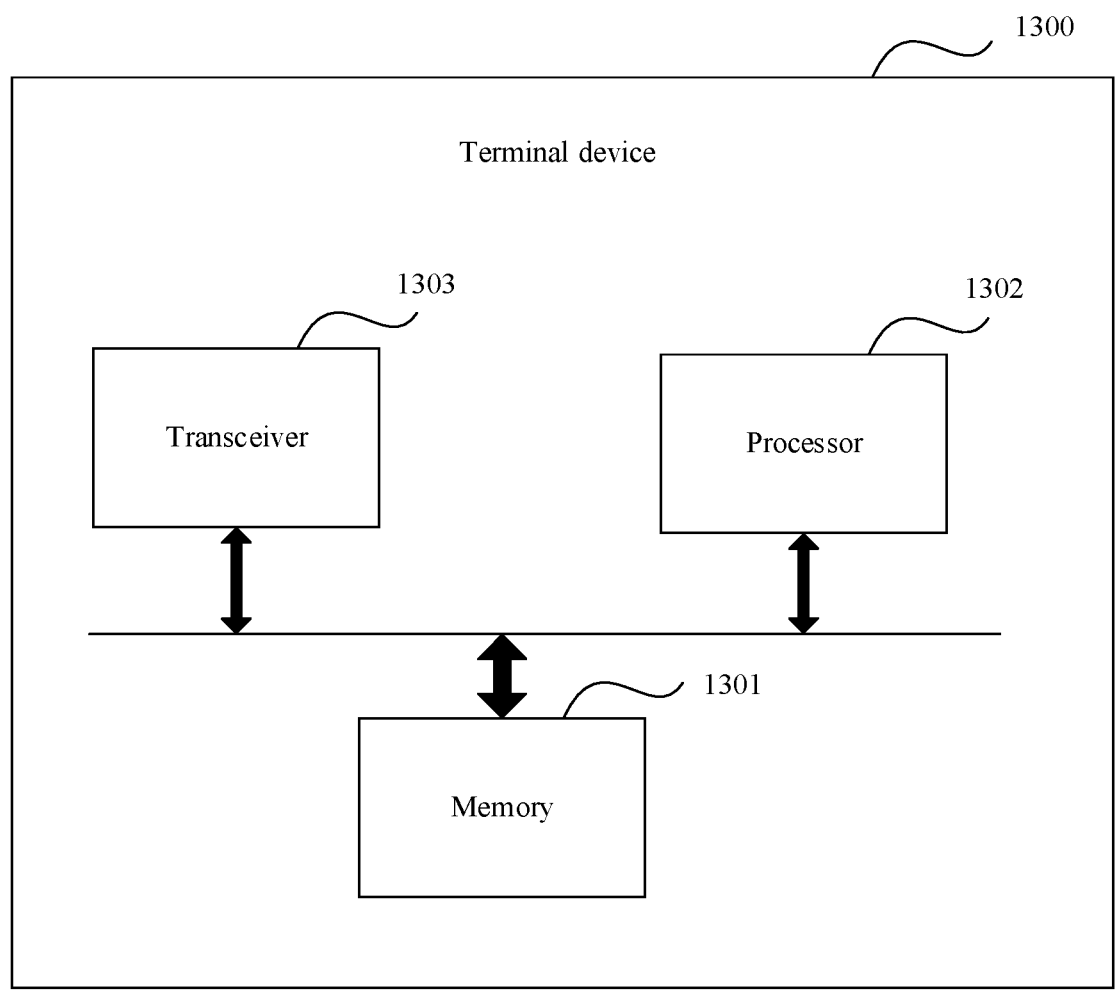
FIG. 13 is a schematic diagram of still another possible terminal device according to this application.

When the processing unit 1202 is a processor, the communications unit 1203 is a transceiver, and the storage unit 1201 is a memory, the terminal device in this application may be a terminal device shown in FIG. 13.

As shown in FIG. 13, the terminal device 1300 includes a processor 1302, a transceiver 1303, and a memory 1301. The transceiver 1303, the processor 1302, and the memory 1301 may communicate with each other, and transfer a control and/or data signal by using an internal connection channel.

It may be clearly understood by a person of skill in the art that, for ease and brief description, a detailed working process of the foregoing apparatus and units may refer to a corresponding process in the foregoing method embodiments, and details are not described herein again.

The terminal device 1200 and the terminal device 1300 provided in this application do not need to generate the pilot signal based on a timeslot number, and the pilot signal no longer jumps over time. Therefore, correlation between pilot signals generated by different terminal devices is reduced. When the terminal device 1200 or the terminal device 1300 is applied to a scenario in which pilot signals sent by a plurality of terminal devices are not completely orthogonal, interference between the plurality of terminal devices may be reduced.

Figure 14:
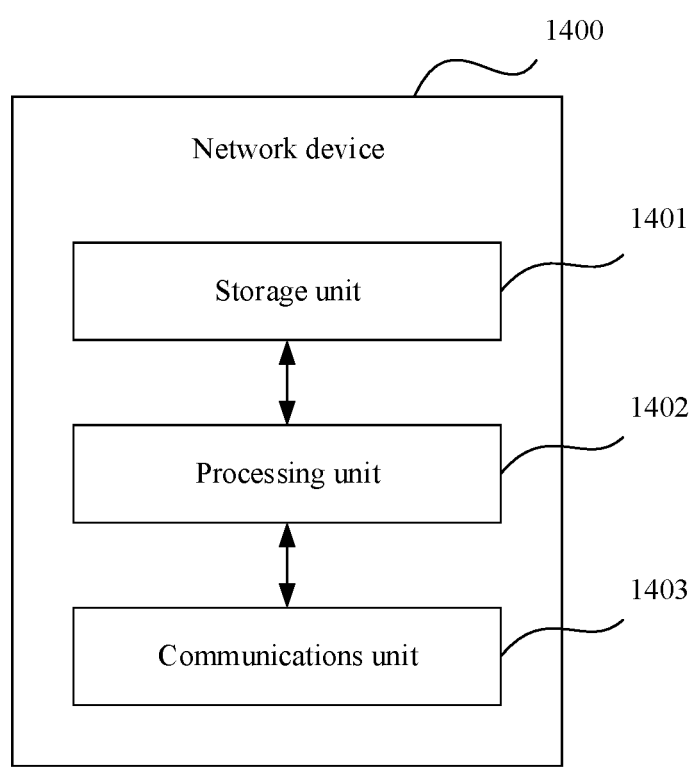
FIG. 14 is a schematic diagram of still another possible network device according to this application.

When an integrated unit is used, FIG. 14 is a possible schematic structural diagram of the network device in the foregoing embodiments. A network device 1400 includes a processing unit 1402 and a communications unit 1403. The processing unit 1402 is configured to control and manage actions of the network device 1400. For example, the processing unit 1402 is configured to support the network device 1400 in performing each step in FIG. 5, and/or is used in another process of the technology described in this specification. The communications unit 1403 is configured to support the network device 1400 in communicating with another communications device, for example, receiving a pilot signal sent by a terminal device. The network device 1400 may further include a storage unit 1401, configured to store program code and data of the network device 1400.

For example, the communications unit 1403 performs: sending an RRC message, where the RRC message includes a port number, the RRC message further includes at least one of a scramble identifier, an identifier of a cell to which the terminal device belongs, and an identifier of the terminal device, where the port number and one identifier of the scramble identifier, the identifier of the cell to which the terminal device belongs, and the identifier of the terminal device are used to generate the pilot signal; and receiving the pilot signal from the terminal device.

The processing unit 1402 is configured to perform: determining, for the terminal device, the at least one of the scramble identifier, the identifier of the cell to which the terminal device belongs, and the identifier of the terminal device.

The processing unit 1402 may be a processor or a controller, and for example, may be a CPU, a general-purpose processor, a DSP, an ASIC, an FPGA, or another programmable logic device, a transistor logic device, a hardware component, or any combination thereof. The processing unit 1402 may implement or execute various example logical blocks, modules, and circuits described with reference to content disclosed in this application. The processor may be a combination implementing a computing function, for example, a combination of one or more microprocessors, or a combination of the DSP and a microprocessor. The communications unit 1403 may be a transceiver, a transceiver circuit, or the like. The storage unit 1401 may be a memory.

Figure 15:
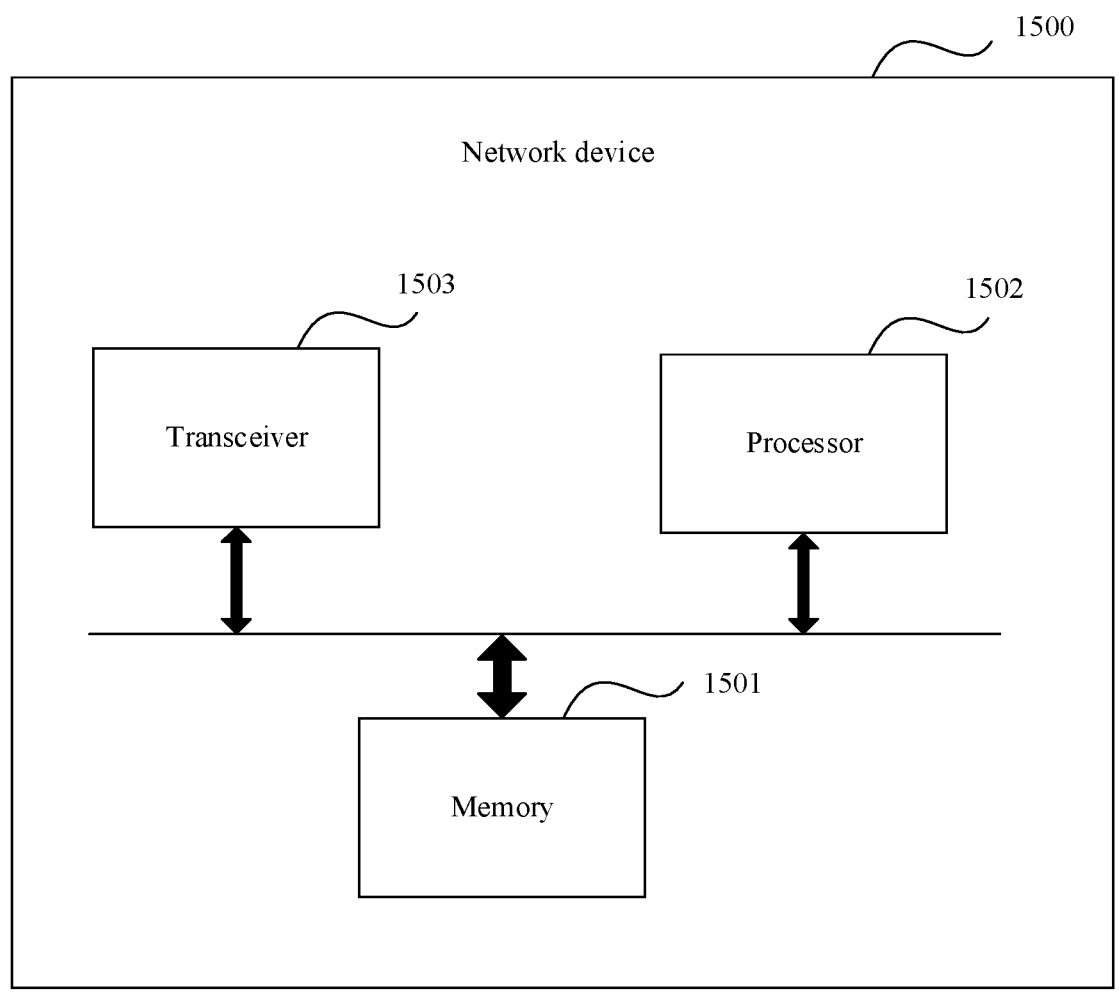
FIG. 15 is a schematic diagram of still another possible network device according to this application.

When the processing unit 1402 is a processor, the communications unit 1403 is a transceiver, and the storage unit 1401 is a memory, the network device in this application may be a network device shown in FIG. 15.

As shown in FIG. 15, the network device 1500 includes a processor 1502, a transceiver 1503, and a memory 1501. The transceiver 1503, the processor 1502, and the memory 1501 may communicate with each other, and transfer a control and/or data signal by using an internal connection channel.

It may be clearly understood by a person of skill in the art that, for ease and brief description, a detailed working process of the foregoing apparatus and units may refer to a corresponding process in the foregoing method embodiments, and details are not described herein again.

A pilot signal received by the network device 1400 or the network device 1500 provided in this application no longer jumps over time. Therefore, correlation between pilot signals generated by different terminal devices is reduced. When the network device 1400 or the network device 1500 is applied to a scenario in which pilot signals sent by a plurality of terminal devices are not completely orthogonal, interference between the plurality of terminal devices may be reduced.

Figure 16:
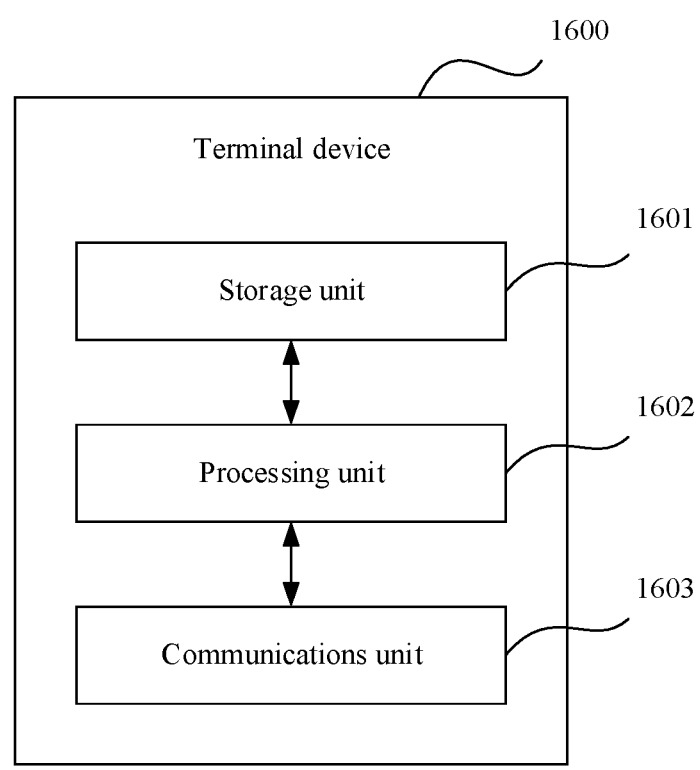
FIG. 16 is a schematic diagram of still another possible terminal device according to this application.

When an integrated unit is used, FIG. 16 is a possible schematic structural diagram of the terminal device in the foregoing embodiments. A terminal device 1600 includes a processing unit 1602 and a communications unit 1603. The processing unit 1602 is configured to control and manage actions of the terminal device 1600. For example, the processing unit 1602 is configured to support the terminal device 1600 in performing each step in FIG. 6, and/or is used in another process of the technology described in this specification. The communications unit 1603 is configured to support the terminal device 1600 in communicating with another communications device, for example, sending a pilot signal generated by the processing unit 1602 to the network device. The terminal device 1600 may further include a storage unit 1601, configured to store program code and data of the terminal device 1600.

For example, the communications unit 1603 is configured to perform: receiving an RRC message, DCI, or a MAC CE, where the RRC message, the DCI, or the MAC CE includes a port number and a plurality of scramble identifiers.

The processing unit 1602 is configured to perform: determining a pilot sequence based on a timeslot number and a scramble identifier corresponding to the timeslot number among the plurality of scramble identifiers; and generating the pilot signal based on the pilot sequence and the port number.

The processing unit 1602 may be a processor or a controller, and for example, may be a CPU, a general-purpose processor, a DSP, an ASIC, an FPGA, or another programmable logic device, a transistor logic device, a hardware component, or any combination thereof. The processing unit 1602 may implement or execute various example logical blocks, modules, and circuits described with reference to content disclosed in this application. The processor may be a combination implementing a computing function, for example, a combination of one or more microprocessors, or a combination of the DSP and a microprocessor. The communications unit 1603 may be a transceiver, a transceiver circuit, or the like. The storage unit 1601 may be a memory.

Figure 17:
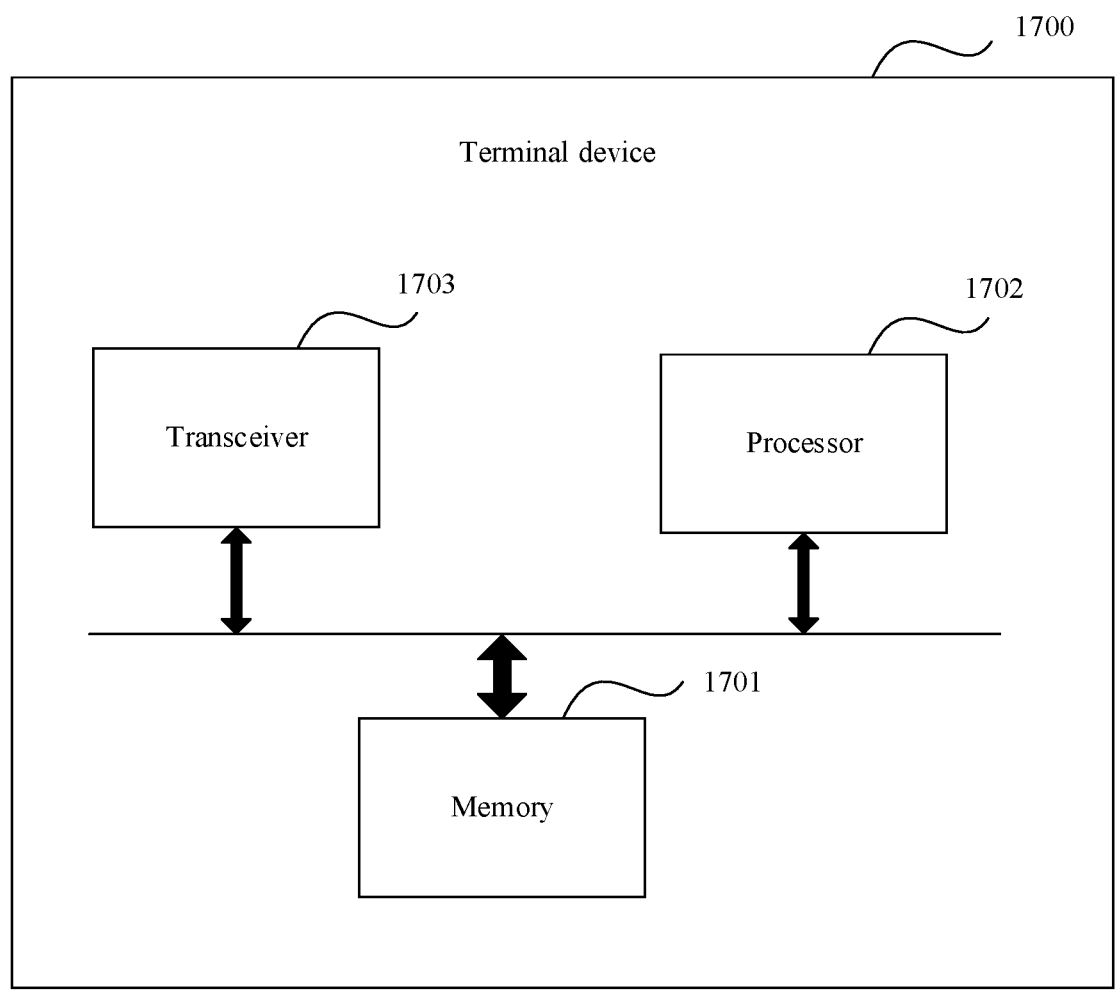
FIG. 17 is a schematic diagram of still another possible terminal device according to this application.

When the processing unit 1602 is a processor, the communications unit 1603 is a transceiver, and the storage unit 1601 is a memory, the terminal device in this application may be a terminal device shown in FIG. 17.

As shown in FIG. 17, the terminal device 1700 includes a processor 1702, a transceiver 1703, and a memory 1701. The transceiver 1703, the processor 1702, and the memory 1701 may communicate with each other, and transfer a control and/or data signal by using an internal connection channel.

It may be clearly understood by a person of skill in the art that, for ease and brief description, a detailed working process of the foregoing apparatus and units may refer to a corresponding process in the foregoing method embodiments, and details are not described herein again.

The terminal device 1600 and the terminal device 1700 provided in this application generate pilot signals based on a timeslot number and a scramble identifier corresponding to the timeslot number, where an effect of the scramble identifier is to offset a negative impact caused by a timeslot number change on correlation between pilot signals. Even if the timeslot number changes, the correlation between pilot signals that are generated based on the timeslot number and a correlation identifier corresponding to the timeslot number still meets a transmission requirement. When the terminal device 1600 or the terminal device 1700 is applied to a scenario in which pilot signals sent by a plurality of terminal devices are not completely orthogonal, interference between the plurality of terminal devices may be reduced.

Figure 18:
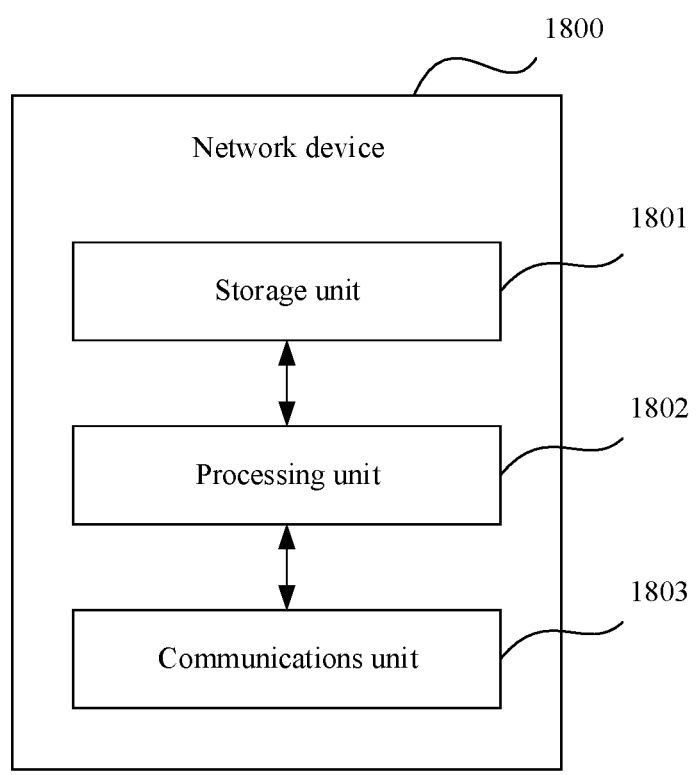
FIG. 18 is a schematic diagram of still another possible network device according to this application.

When an integrated unit is used, FIG. 18 is a possible schematic structural diagram of the network device in the foregoing embodiments. A network device 1800 includes a processing unit 1802 and a communications unit 1803. The processing unit 1802 is configured to control and manage actions of the network device 1800. For example, the processing unit 1802 is configured to support the network device 1800 in performing each step in FIG. 7, and/or is used in another process of the technology described in this specification. The communications unit 1803 is configured to support the network device 1800 in communicating with another communications device, for example, receiving a pilot signal sent by a terminal device. The network device 1800 may further include a storage unit 1801, configured to store program code and data of the network device 1800.

For example, the communications unit 1803 is configured to perform:

sending an RRC message, DCI, or a MAC CE to the terminal device, where the RRC message, the DCI, or the MAC CE includes a port number and a plurality of scramble identifiers, the plurality of scramble identifiers have a one-to-one correspondence with a plurality of timeslot numbers, and the port number, the plurality of scramble identifiers, and the plurality of timeslot numbers are used to generate the pilot signal; and receiving the pilot signal from the terminal device.

The processing unit 1802 may be a processor or a controller, and for example, may be a CPU, a general-purpose processor, a DSP, an ASIC, an FPGA, or another programmable logic device, a transistor logic device, a hardware component, or any combination thereof. The processing unit 1802 may implement or execute various example logical blocks, modules, and circuits described with reference to content disclosed in this application. The processor may be a combination implementing a computing function, for example, a combination of one or more microprocessors, or a combination of the DSP and a microprocessor. The communications unit 1803 may be a transceiver, a transceiver circuit, or the like. The storage unit 1801 may be a memory.

Figure 19:
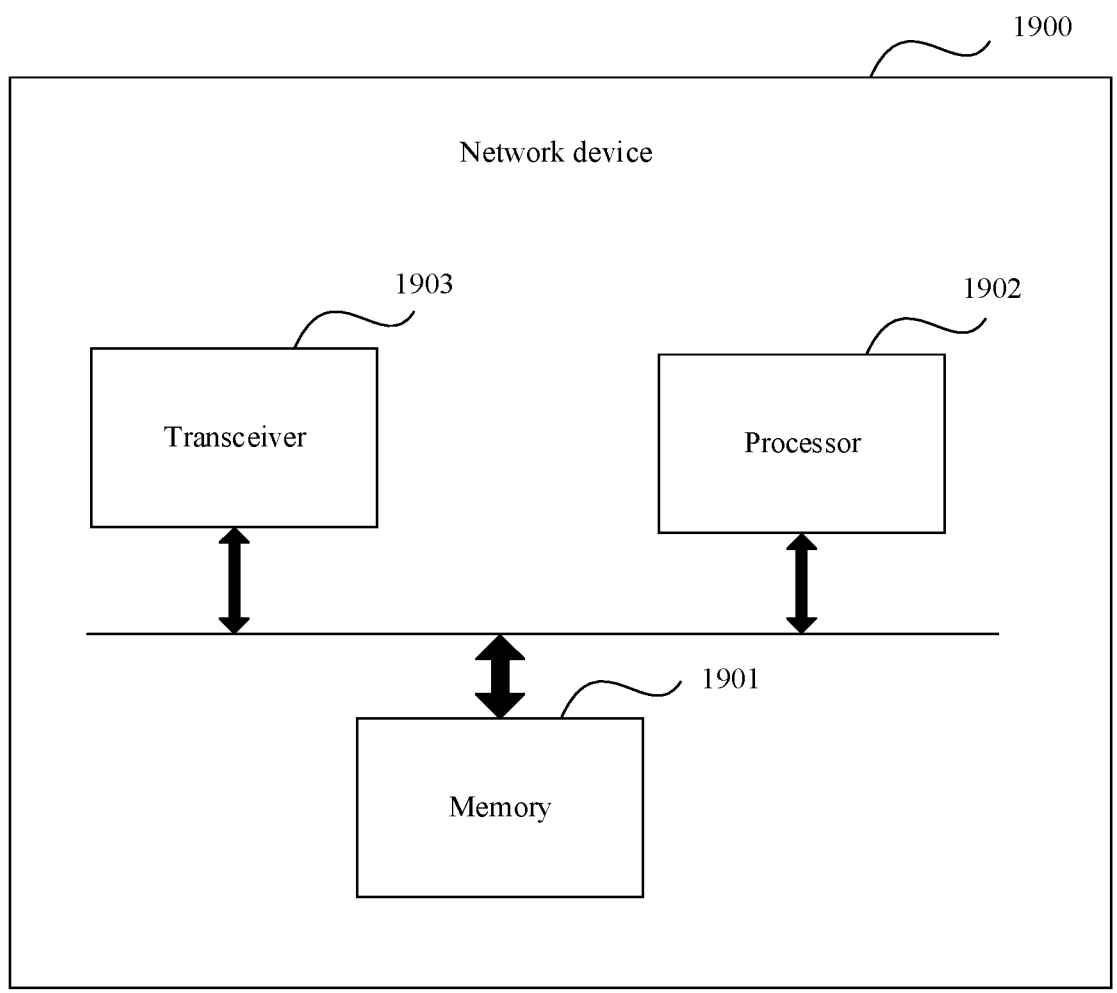
FIG. 19 is a schematic diagram of still another possible network device according to this application.

When the processing unit 1802 is a processor, the communications unit 1803 is a transceiver, and the storage unit 1801 is a memory, the network device in this application may be a network device shown in FIG. 19.

As shown in FIG. 19, the network device 1900 includes a processor 1902, a transceiver 1903, and a memory 1901. The transceiver 1903, the processor 1902, and the memory 1901 may communicate with each other, and transfer a control and/or data signal by using an internal connection channel.

It may be clearly understood by a person of skill in the art that, for ease and brief description, a detailed working process of the foregoing apparatus and units may refer to a corresponding process in the foregoing method embodiments, and details are not described herein again.

The network device 1800 and the network device 1900 provided in this application configure a plurality of scramble identifiers for a terminal device, where the plurality of scramble identifiers have a one-to-one correspondence with a plurality of timeslot numbers, so that the terminal device generates a pilot signal based on a timeslot number and the scramble identifier corresponding to the timeslot number. An effect of the scramble identifier is to offset a negative impact caused by a timeslot number change on correlation between pilot signals. Even if the timeslot number changes, the correlation between pilot signals that are generated based on the timeslot number and a correlation identifier corresponding to the timeslot number still meets a transmission requirement. When the network device 1800 or the network device 1900 is applied to a scenario in which pilot signals sent by a plurality of terminal devices are not completely orthogonal, interference between the plurality of terminal devices may be reduced.

It should be understood that the foregoing transceiver may include a transmitter and a receiver. The transceiver may further include an antenna, where there may be one or more antennas. The memory may be an independent device, or may be integrated in a processor.

All or some of the foregoing devices may be integrated into a chip for implementation, and for example, may be integrated into a baseband chip for implementation. The chip integrates a kernel, an input/output interface, and the like, where the input/output interface may implement functions of the foregoing communications units in FIG. 8, FIG. 10, FIG. 12, FIG. 14, FIG. 16, and FIG. 18, but in this case, a signal at the input/output port is the baseband signal. The kernel may implement processing functions of processing units in FIG. 8, FIG. 10, FIG. 12, FIG. 14, FIG. 16, and FIG. 18. Functions of the kernel and the input/output interface may be implemented by hardware, or may be implemented by executing corresponding software by the hardware. The hardware or the software includes one or more modules corresponding to the foregoing functions.

The network device or the terminal device in the apparatus embodiments completely corresponds to that in the method embodiments, and a corresponding module performs a corresponding step. For example, a sending module or a transmitter performs sending steps in the method embodiments, a receiving module or a receiver performs receiving steps in the method embodiments, and other steps other than the sending and receiving steps may be performed by a processing module or a processor. For a function of a specific module, refer to a corresponding method embodiment, and details are not described again.

In various embodiments of this application, a sequence number of each process does not mean an execution sequence. The execution sequence of each process should be determined based on functions and internal logic of the process, and should not be construed as any limitation on the implementation processes of this application.

In addition, the term "and/or" in this specification is only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by executing a software instruction by a processor. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a mobile hard disk, a compact disc read only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in a terminal device or a network device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on technical solutions of this application shall fall within the protection scope of this application.

What is claimed is:

1. An apparatus for generating a pilot signal, comprising a processing unit, wherein the processing unit is configured to:
   receive an RRC message, downlink control information (DCI), or a media access control (MAC) control element (CE) through a communications unit, wherein the RRC message, the DCI, or the MAC CE comprises a cyclic shift value index;
   obtain a correlation identifier and a port number based on the received message;
   determine a pilot sequence based on the correlation identifier and the cyclic shift value index; and
   generate the pilot signal based on the pilot sequence and the port number.

2. The apparatus according to claim 1, wherein the processing unit is configured to:
   when a value of the correlation identifier is equal to a preset value, determine the pilot sequence based on a timeslot number and at least one parameter of an identifier of a cell to which the apparatus belongs, an identifier of the apparatus, and a scramble identifier; or
   when a value of the correlation identifier is not equal to a preset value, determine the pilot sequence based on the correlation identifier and at least one parameter of an identifier of a cell to which the apparatus belongs, an identifier of the apparatus, and a scramble identifier.

3. The apparatus according to claim 1, wherein the processing unit is configured to:
   when a value of the correlation identifier is equal to a preset value, determine the pilot sequence based on a timeslot number and at least one parameter of an identifier of a cell to which the apparatus belongs, an identifier of the apparatus, and a scramble identifier; or
   when a value of the correlation identifier is not equal to a preset value, determine the pilot sequence based on at least one parameter of an identifier of a cell to which the apparatus belongs, an identifier of the apparatus, and a scramble identifier.

4. The apparatus according to claim 2, wherein the apparatus further comprises a communications unit, and the processing unit is configured to:
   receive a radio resource control (RRC) message through the communications unit, wherein the RRC message comprises configuration information of the scramble identifier.

5. The apparatus according to claim 4, wherein the RRC message comprises configuration information of a plurality of scramble identifiers, and the processing unit is further configured to:
   receive downlink control information (DCI) through the communications unit, wherein the DCI comprises a scramble identifier index, and the scramble identifier index is used to indicate a scramble identifier used to determine the pilot sequence among the plurality of scramble identifiers.

6. The apparatus according to claim 4, wherein when determining the pilot sequence, the processing unit is further configured to use a scramble identifier associated with a timeslot at which the pilot signal is located as a parameter that determines the pilot sequence.

7. The apparatus according to claim 1, wherein the apparatus further comprises the communications unit, and the processing unit is configured to:
   obtain the correlation identifier and the port number based on the RRC message received by the communications unit; or
   obtain the correlation identifier based on the RRC message received by the communications unit, and obtain the port number based on the DCI received by the communications unit; or
   obtain the correlation identifier and the port number based on the received DCI.

8. An apparatus for receiving a pilot signal, comprising a communications unit and a processing unit, wherein the processing unit is configured to control the communications unit to:
   send a correlation identifier and a port number to a terminal device, wherein the correlation identifier and the port number are used to generate the pilot signal; and
   receive the pilot signal from the terminal device;
   wherein when a value of the correlation identifier is equal to a preset value, the correlation identifier is used to instruct the terminal device to generate the pilot signal in a first pattern; or
   when a value of the correlation identifier is not equal to a preset value, the correlation identifier is used to instruct the terminal device to generate the pilot signal in a second pattern.

9. The apparatus according to claim 8, wherein the communications unit is configured to:
   send a radio resource control (RRC) message to the terminal device, wherein the RRC message comprises the correlation identifier and the port number; or
   send the RRC message to the terminal device, wherein the RRC message comprises the correlation identifier, and send downlink control information (DCI) to the terminal device, wherein the DCI comprises the port number.

10. A method for receiving a pilot signal, comprising:
    sending, by a network device, a correlation identifier and a port number to a terminal device, wherein the correlation identifier and the port number are used to generate the pilot signal; and
    receiving, by the network device, the pilot signal from the terminal device;
    wherein when a value of the correlation identifier is equal to a preset value, the correlation identifier is used to instruct the terminal device to generate the pilot signal in a first pattern; or
    when a value of the correlation identifier is not equal to a preset value, the correlation identifier is used to instruct the terminal device to generate the pilot signal in a second pattern.

11. The method according to claim 10, wherein the sending, by a network device, a correlation identifier and a port number to a terminal device comprises:
    sending, by the network device, a radio resource control (RRC) message to the terminal device, wherein the RRC message comprises the correlation identifier and the port number; or
    sending, by the network device, an RRC message to the terminal device, wherein the RRC message comprises the correlation identifier, and sending, by the network device, downlink control information (DCI) to the terminal device, wherein the DCI comprises the port number.

* * * * *

UNITED STATES PATENT AND TRADEMARK OFFICE
CERTIFICATE OF CORRECTION

PATENT NO. : 11,271,787 B2
APPLICATION NO. : 16/811139
DATED : March 8, 2022
INVENTOR(S) : Wang et al.

It is certified that error appears in the above-identified patent and that said Letters Patent is hereby corrected as shown below:

On the Title Page

Item (63), in Column 1, in "Related U.S. Application Data", Line 2, delete "PCT/CT2018/104921," and insert -- PCT/CN2018/104921, --.

In the Specification

In Column 17, Lines 40-41, delete "S211. The terminal device obtains the correlation identifier based on the received RRC message." and insert the same on Column 17, Line 41, as a new paragraph.

In Column 19, Line 62, delete "(13)" and insert -- (13), --.

Signed and Sealed this
Fourteenth Day of June, 2022

Katherine Kelly Vidal
*Director of the United States Patent and Trademark Office*